(12) United States Patent
Ejima et al.

(10) Patent No.: US 8,614,752 B2
(45) Date of Patent: Dec. 24, 2013

(54) ELECTRONIC STILL CAMERA WITH PEAKING FUNCTION

(75) Inventors: Satoshi Ejima, Tokyo (JP); Hirotake Nozaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 54 days.

(21) Appl. No.: 12/926,563

(22) Filed: Nov. 24, 2010

(65) Prior Publication Data

US 2011/0080497 A1    Apr. 7, 2011

Related U.S. Application Data

(63) Continuation of application No. 11/245,194, filed on Oct. 7, 2005, now abandoned, which is a continuation of application No. 09/661,430, filed on Sep. 13, 2000, now abandoned.

(30) Foreign Application Priority Data

| Sep. 14, 1999 | (JP) | 11-260836 |
| Sep. 14, 1999 | (JP) | 11-260837 |
| Oct. 26, 1999 | (JP) | 11-303990 |
| Oct. 26, 1999 | (JP) | 11-303991 |
| Nov. 9, 1999 | (JP) | 11-318163 |

(51) Int. Cl.
   *H04N 5/228*    (2006.01)
   *H04N 5/235*    (2006.01)
   *G06K 9/40*    (2006.01)
(52) U.S. Cl.
   USPC ............ 348/229.1; 348/222.1; 382/266; 382/254

(58) Field of Classification Search
   USPC ............ 348/240.2, 345, 14.03, 222.1–230.1, 348/234–238, 333.01–333.13; 382/266–269, 274, 254
   See application file for complete search history.

(56) References Cited

U.S. PATENT DOCUMENTS 4,617,459 A * 10/1986 Akashi et al. .............. 250/201.7
4,652,908 A    3/1987 Fling et al.
(Continued)

FOREIGN PATENT DOCUMENTS

| JP | A-61-123368 | 6/1986 |
| JP | A-01-241276 | 9/1989 |

(Continued)

OTHER PUBLICATIONS

Sep. 28, 2010 Office Action issued in Japanese Patent Application No. 2008-199321 with English translation.

(Continued)

*Primary Examiner* — Chia-Wei A Chen
*Assistant Examiner* — Lin Ye
(74) *Attorney, Agent, or Firm* — Oliff & Berridge, PLC

(57) ABSTRACT

An image signal resulting from an image-capturing operation performed at a CCD undergoes analog processing at an image processing unit. Image data resulting from the analog processing are first digitized at an A/D conversion circuit and then undergo image processing at a DSP. The image data having undergone the image processing are stored in a frame memory. At a peaking processing circuit, a brightness signal Y stored in a Y signal memory of the frame memory is read out and differentiated at a differentiation circuit. The differentiated signal is amplified at an amplifier circuit and then the amplified signal is added to the original brightness signal Y at an adder circuit. A brightness signal Y' representing the sum is output to a display LCD. The edges in the image signal are emphasized in the display on the display LCD.

7 Claims, 29 Drawing Sheets

(56) References Cited

U.S. PATENT DOCUMENTS

| | | | |
|---|---|---|---|
| 4,860,045 A * | 8/1989 | Hamada et al. | 396/95 |
| 5,200,828 A * | 4/1993 | Jang et al. | 348/345 |
| 5,293,580 A * | 3/1994 | Shimizu | 382/243 |
| 5,491,761 A * | 2/1996 | Kim | 382/251 |
| 5,513,016 A | 4/1996 | Inoue | 358/3.26 |
| 5,608,451 A * | 3/1997 | Konno et al. | 348/69 |
| 5,638,184 A | 6/1997 | Fujimoto et al. | |
| 5,729,360 A * | 3/1998 | Kita et al. | 358/500 |
| 5,933,187 A | 8/1999 | Hirasawa et al. | |
| 5,974,190 A * | 10/1999 | Maeda et al. | 382/255 |
| 6,118,485 A * | 9/2000 | Hinoue et al. | 348/373 |
| 6,163,389 A * | 12/2000 | Buhr et al. | 358/527 |
| 6,167,167 A * | 12/2000 | Matsugu et al. | 382/283 |
| 6,407,747 B1 * | 6/2002 | Chui et al. | 345/660 |
| 6,411,305 B1 * | 6/2002 | Chui | 345/660 |
| 6,424,888 B1 * | 7/2002 | Sone et al. | 701/1 |
| 6,545,715 B1 * | 4/2003 | Na | 348/351 |
| 6,636,262 B1 * | 10/2003 | Okajima et al. | 348/350 |
| 6,646,680 B1 | 11/2003 | Mead et al. | |
| 6,707,485 B1 * | 3/2004 | Higuchi et al. | 348/69 |
| 6,816,610 B1 * | 11/2004 | Beckwith | 382/162 |
| 6,914,628 B1 * | 7/2005 | Kuwata et al. | 348/272 |
| 6,954,228 B1 | 10/2005 | Acharya et al. | |
| 7,283,683 B1 * | 10/2007 | Nakamura et al. | 382/274 |
| 2004/0160511 A1 * | 8/2004 | Boesen | 348/14.02 |

FOREIGN PATENT DOCUMENTS

| | | |
|---|---|---|
| JP | A-04-083478 | 3/1992 |
| JP | A-H04-126461 | 4/1992 |
| JP | A-04-367172 | 12/1992 |
| JP | A-05-122577 | 5/1993 |
| JP | A-05-199443 | 8/1993 |
| JP | A-06-28392 | 2/1994 |
| JP | A-07-023284 | 1/1995 |
| JP | A-07-046453 | 2/1995 |
| JP | A-07-143388 | 2/1995 |
| JP | A-08-279950 | 10/1996 |
| JP | A-09-093470 | 4/1997 |
| JP | A-09-093486 | 4/1997 |
| JP | A-H09-163294 | 6/1997 |
| JP | A-09-247543 | 9/1997 |
| JP | A-11-046368 | 2/1999 |
| JP | A-H11-66297 | 3/1999 |
| WO | WO 96/08919 | 3/1996 |

OTHER PUBLICATIONS

Dec. 14, 2010 Office Action issued in Japanese Patent Application No. 2008-199321 (with translation).

* cited by examiner

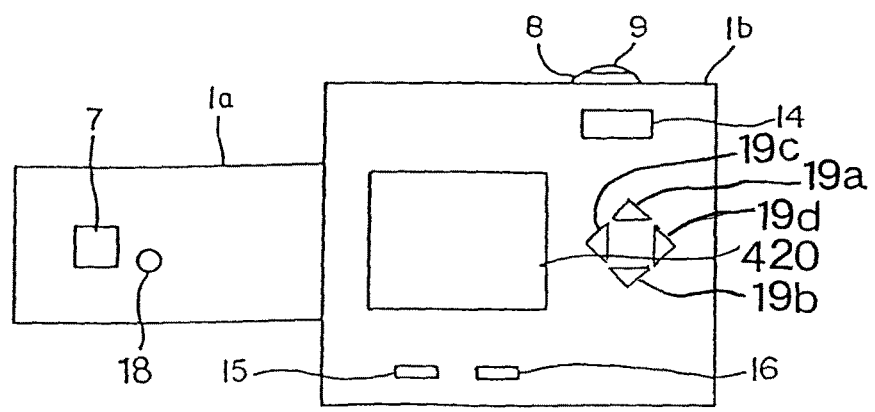

FIG. 9A

| G | B | G | B | G | B | G | B | ... |
|---|---|---|---|---|---|---|---|---|
| R | G | R | G | R | G | R | G | ... |
| G | B | G | B | G | B | G | B | ... |
| R | G | R | G | R | G | R | G | ... |
| G | B | G | B | G | B | G | B | ... |
| R | G | R | G | R | G | R | G | ... |
| G | B | G | B | G | B | G | B | ... |

FIG. 9B

| G | Ye | G | Ye | G | Ye | G | Ye | ... |
|---|---|---|---|---|---|---|---|---|
| Cy | Ma | Cy | Ma | Cy | Ma | Cy | Ma | ... |
| G | Ye | G | Ye | G | Ye | G | Ye | ... |
| Cy | Ma | Cy | Ma | Cy | Ma | Cy | Ma | ... |
| G | Ye | G | Ye | G | Ye | G | Ye | ... |
| Cy | Ma | Cy | Ma | Cy | Ma | Cy | Ma | ... |
| G | Ye | G | Ye | G | Ye | G | Ye | ... |

FIG. 17 A

| G$_{1,1}$ | B$_{1,6}$ | G$_{1,11}$ | B$_{1,16}$ |
|---|---|---|---|
| R$_{6,1}$ | G$_{6,6}$ | R$_{6,11}$ | G$_{6,16}$ |
| G$_{11,1}$ | B$_{11,6}$ | G$_{11,11}$ | B$_{11,16}$ |
| R$_{16,1}$ | G$_{16,6}$ | R$_{16,11}$ | G$_{16,16}$ |

FIG. 17 B

| Y$_{1,1}$ | Y$_{1,6}$ | Y$_{1,11}$ | Y$_{1,16}$ |
|---|---|---|---|
| Y$_{6,1}$ | Y$_{6,6}$ | Y$_{6,11}$ | Y$_{6,16}$ |
| Y$_{11,1}$ | Y$_{11,6}$ | Y$_{11,11}$ | Y$_{11,16}$ |
| Y$_{16,1}$ | Y$_{16,6}$ | Y$_{16,11}$ | Y$_{16,16}$ |

FIG. 17 C

| Y$_{6,6}$ | Y$_{6,6}$ | Y$_{6,11}$ | Y$_{6,11}$ |
|---|---|---|---|
| Y$_{6,6}$ | Y$_{6,6}$ | Y$_{6,11}$ | Y$_{6,11}$ |
| Y$_{11,6}$ | Y$_{11,6}$ | Y$_{11,11}$ | Y$_{11,11}$ |
| Y$_{11,6}$ | Y$_{11,6}$ | Y$_{11,11}$ | Y$_{11,11}$ |

ELECTRONIC STILL CAMERA WITH PEAKING FUNCTION

This is a Continuation of application Ser. No. 11/245,194 filed Oct. 7, 2005, which is a Continuation of application Ser. No. 09/661,430 filed Sep. 13, 2000. The disclosures of the prior applications are incorporated by reference herein in their entirety.

INCORPORATION BY REFERENCE

The disclosures of the following priority publications are herein incorporated by reference:
Japanese Patent Application No. 11-260837 filed Sep. 14, 1999;
Japanese Patent Application No. 11-260836 filed Sep. 14, 1999;
Japanese Patent Application No. 11-303991 filed Oct. 26, 1999;
Japanese Patent Application No. 11-303990 filed Oct. 26, 1999;
Japanese Patent Application No. 11-318163 filed Nov. 9, 1999.

BACKGROUND OF THE INVENTION

1. Field of the Invention

The present invention relates to an electronic still camera that records in a recording medium image data obtained by capturing an image of a subject by an image-capturing device such as a CCD.

2. Description of the Related Art

Electronic cameras in the prior art include those provided with an image-capturing device that captures a subject image passing through a taking lens and outputs an image signal and an image signal processing circuit that engages in so-called peaking processing on the image-capture signal output from the image-capturing device whereby an area of the image achieving a high degree of contrast is emphasized by emphasizing the high-frequency component signal relative to the low frequency component signal. For instance, in a television camera disclosed in Japanese Patent Publication No. 6-28392, the contrast of an image in the viewfinder is enhanced by correcting the visual spatial frequency characteristics to achieve high-definition around the edges of the image through a focal adjustment.

SUMMARY OF THE INVENTION

An object of the present invention is to provide an electronic still camera capable of implementing peaking processing on an image-capture signal.

In order to achieve the object described above, an electronic still camera according to the present invention comprises an image-capturing device that captures a subject image through a taking lens, a reproduction control circuit that reads out and reproduces image data recorded in a recording medium, a signal processing circuit that emphasizes the image data by implementing a specific type of processing on the image data output from the reproduction control circuit, a display device that displays an image corresponding to the image data, a first switch that is engaged to perform a frame feed and a frame rewind of the image data to be reproduced by the reproduction control circuit, a second switch that is engaged to turn on/off the signal processing circuit, and a display control circuit that selects an image to be displayed on the display device in response to an operation effected through the first switch and the second switch.

The first switch is also operated to perform frame feed and frame rewind of the image data to be reproduced by the reproduction control circuit one frame at a time.

According to another aspect of the present invention, an electronic still camera of the present invention comprises a mode selector switch that selects either a recording mode for recording image data in a recording medium or a reproduction mode for reading out and reproducing the image data recorded at the recording medium, a signal processing circuit that emphasizes the image data by implementing a specific type of processing on the image data, a display device that displays an image based upon the image data, a storage circuit that stores in memory the on/off state of the signal processing circuit in the reproduction mode, and a switching control circuit that stores in the storage circuit the on/off state of the signal processing circuit during the reproduction mode preceding a switch to the recording mode effected through the mode selector switch, turns off the signal processing circuit during the recording mode resulting from the switch, and turns on/off the signal processing circuit in correspondence to the on/off state of the signal processing circuit stored in the storage circuit during the reproduction mode following a switch to the reproduction mode effected through the mode selector switch.

According to a further aspect of the present invention, an electronic still camera of the present invention comprises an image-capturing device that captures a subject image through a taking lens, a signal processing circuit that emphasizes an image-capture signal output from the image-capturing device by implementing a specific type of processing on the image-capture signal, and a control circuit that sets specific photographing conditions when the signal processing circuit is turned on.

The electronic still camera above is further provided with a focus mode selector switch that selects an autofocus mode for performing an automatic focusing operation to focus the subject image on the image-capturing device or a manual focus mode for performing a manual focusing operation, to enable the control circuit to set the manual focus mode if the autofocus mode has been set through the focus mode selector switch when the signal processing circuit is turned on.

According to a further aspect of the present invention, an electronic still camera of the present invention comprises an image-capturing device that captures a subject image through a taking lens, an exposure mode selector switch that selects and sets an exposure mode among a shutter speed priority exposure mode, in which the aperture value is determined in correspondence to the brightness of the subject image by giving priority to the shutter speed, an aperture priority exposure mode, in which the shutter speed is determined in correspondence to the brightness of the subject image by giving priority to the aperture value and a program exposure mode, in which both the shutter speed and the aperture value are set at specific values corresponding to the brightness of the subject image, an aperture device that adjusts the exposure quantity at the image-capturing device in conformance to the aperture value, a signal processing circuit that emphasizes an image-capture signal output from the image-capturing device by implementing a specific type of processing on the image-capture signal, and a control circuit that implements control on the aperture device prior to a shutter release, to be opened or to be set at a specific aperture value in correspondence to the on/off state of the signal processing circuit and the exposure mode selected through the exposure mode selector switch.

If, at least, the signal processing circuit is in an on state and the aperture priority exposure mode is selected through the exposure mode selector switch, the control circuit may implement control on the aperture device to be set at the specific aperture value prior to the shutter release.

According to a further aspect of the present invention, an electronic still camera of the present invention comprises an image-capturing device that captures a subject image through a taking lens, a signal processing circuit that emphasizes an image-capture signal output from the image-capturing device by implementing a specific type of processing on the image-capture signal, and a control circuit that implements control on the signal processing circuit to emphasize image-capture signals corresponding to a plurality of split areas set in advance within the photografic field.

The electronic still camera described above may be further provided with a focal point detection circuit that detects a focal adjustment state achieved by the taking lens in each of the plurality of split areas.

The electronic still camera described above is further provided with a selector switch engaged to select an arbitrary area among the plurality of split areas.

According to a further aspect of the present invention, an electronic still camera of the present invention comprises an image-capturing device that captures a subject image through a taking lens, a signal processing circuit that emphasizes an image-capture signal output from the image-capturing device by implementing a specific type of processing on the image-capture signal, a magnification adjustment circuit that adjusts the magnification of the image corresponding to the image-capture signal independently of the signal processing circuit, and a display device that displays the image corresponding to the image-capture signal.

According to a further aspect of the present invention, an electronic still camera of the present invention comprises an image-capturing device that captures a subject image through a taking lens, a signal processing circuit that emphasizes an image-capture signal output by the image-capturing device by implementing a specific type of processing on the image-capture signal, a magnification adjustment circuit that adjusts the magnification of the image corresponding to the image-capture signal output from the signal processing circuit, and a display device that displays an image corresponding to the image-capture signal output from the magnification adjustment circuit.

According to a further aspect of the present invention, an electronic still camera of the present invention comprises an image-capturing device that captures a subject image through a taking lens, a magnification adjustment circuit that adjusts the magnification of the image corresponding to an image-capture signal output from the image-capturing device, a signal processing circuit that subsamples the image-capture signal output from the magnification adjustment circuit to emphasize the subsampled image-capture signal by implementing a specific type of processing on the subsampled image-capture signal, and a display device that displays an image corresponding to image-capture signal output from the signal processing circuit.

The image-capture signal output from the magnification adjustment circuit may be subsampled at a ratio of 1/(new magnification set by magnification adjustment circuit).

According to a further aspect of present invention, an electronic still camera of the present invention comprises an image-capturing device that captures a subject image through a taking lens, a recording control circuit that records in a recording medium image data corresponding to an image-capture signal output from the image-capturing device, and a signal processing circuit that emphasizes the image-capture signal by implementing a specific type of processing on the image-capture signal.

According to a further aspect of the present invention, an electronic still camera of the present invention comprises an image-capturing device that captures a subject image through a taking lens, a subsampling circuit that subsamples image-capture signal output from the image-capturing device and reads out the subsampled image-capture signal, and a signal processing circuit that emphasizes the subsampled image-capture signal by implementing an a specific type of processing on the subsampled image-capture signal.

The electronic still camera described above is further provided with a display device that displays a subject image by using the subsampled image-capture signal read out by the subsampling circuit.

The electronic still camera described above is further provided with a contrast detection circuit that detects the contrast in the subject image by using the subsampled image-capture signal read out by the subsampling circuit and a focal point detection circuit that detects a focal adjustment state of the taking lens by using the results of the detection performed by the contrast detection circuit.

According to a further aspect of the present invention, an electronic still camera of the present invention comprises an image-capturing device that captures a subject image through a taking lens, a signal processing circuit that emphasizes an image-capture signal output from the image-capturing device by implementing a specific type of processing on the image-capture signal, and a control circuit that sets the signal processing circuit in an on state or an off state in correspondence to the photographing conditions.

The electronic still camera described above is further provided with a focus mode selector switch engaged to select an autofocus mode for performing an automatic focusing operation to focus the subject image on the image-capturing device or a manual focus mode for performing a manual focusing operation, to enable the control circuit to turn off the signal processing circuit when the autofocus mode is selected through the focus mode selector switch and to turn on the signal processing circuit when the manual focus mode is selected.

The control circuit may turn on the signal processing circuit when the manual focus mode is selected through the focus mode selector switch, turn off the signal processing circuit when a specific length of time has elapsed following the switch to the manual focus mode and then turn on the signal processing circuit again when a manual focusing operation is performed subsequently.

The electronic still camera described above may be further provided with a macro photographing mode selector switch engaged to select a macro photographing mode for performing a macro photographing operation or a normal photographing mode for performing a photographing operation within the normal distance range, to allow the control circuit to turn on the signal processing circuit when the macro photographing mode is selected through the macro photographing mode selector switch.

The electronic still camera described above may be further provided with an exposure mode selector switch for setting at least either an aperture priority exposure mode for achieving an exposure adjustment in correspondence to the brightness of the subject image by giving priority to the aperture value or a manual exposure mode for allowing the photographer to determine both the aperture value and the shutter speed as an exposure mode in conformance to which the exposure quantity for the image-capturing device is determined, the exposure made selector switch being engaged to select one exposure mode, to enable the control circuit to turn on the signal processing circuit when at least either the aperture priority exposure mode or the manual exposure mode is selected through the exposure mode selector switch.

The electronic still camera described above may be further provided with a zoom switch through which the focal length is adjusted by driving the taking lens, with the control circuit turning off the signal processing circuit when the zoom switch is engaged in operation.

The electronic still camera described above may be further provided with a brightness detection circuit that detects the brightness of the subject image, with the control circuit turning off the signal processing circuit when the detection value obtained by the brightness detection circuit is equal to or less than a specific value.

The electronic still camera described above may be further provided with a frame selector switch that selects a single frame photographing mode for photographing a subject image one frame at a time or a continuous frame photographing mode for photographing a subject image continuously, with the control circuit turning off the signal processing circuit when the continuous frame photographing mode is selected through the frame selector switch.

The electronic still camera described above may be further provided with a distant view photographing mode selector switch that selects a distant view photographing mode for photographing a distant view or a normal photographing mode for performing a photographing operation within a normal distance range, with the control circuit turning off the signal processing circuit when the distant view photographing mode is selected through the distant view photographing mode selector switch.

The electronic still camera described above may be further provided with an autofocus mode selector switch that selects a continuous autofocus mode for continuously performing a focusing operation to automatically focus the subject image on the image-capturing device or a single autofocus mode for performing a focusing operation once only, with the control circuit turning off the signal processing circuit when the continuous autofocus mode is selected through the autofocus mode selector switch.

The control circuit may switch the on/off state of the signal processing circuit depending upon whether or not the focusing operation ends when the single autofocus mode is selected through the autofocus mode selector switch.

The electronic still camera described above may be further provided with a display device that displays an image-capture signal output from the signal processing circuit and a display control circuit that turns on/off a display at the display device, with the control circuit turning off the signal processing circuit when the display is turned off by the display control circuit.

According to a further aspect of the present invention, an electronic still camera of the present invention comprises an image-capturing device that captures a subject image through a taking lens, a signal processing circuit that emphasizes an image-capture signal output from the image-capturing device by implementing specific type of processing on the image-capture signal, a release switch operated to start a photographing operation, and a control circuit that switches the on/off state of the signal processing circuit in response to an operation of the release switch.

The control circuit may switch the on/off state of the signal processing circuit each time the release switch is double-clicked.

The control circuit may turn on the signal processing circuit in response to a halfway-press operation of the release switch and turn off the signal processing circuit when a specific length of time has elapsed following the halfway-press operation.

According to a further aspect of the present invention, an electronic still camera of the present invention comprises an image-capturing device that captures a subject image through a taking lens, a signal processing circuit that emphasizes an image-capture signal output from the image-capturing device by implementing specific type of processing on the image-capture signal, a recording control circuit that records image data at a recording medium, a mode selector switch that selects a recording mode for recording image data in the recording medium or a reproduction mode for reproducing the image data recorded in the recording medium and a means for control circuit that turns off the signal processing circuit when the reproduction mode is selected through the mode selector switch.

According to a further aspect of the present invention, an electronic still camera of the present invention comprises an image-capturing device that captures a subject image through a taking lens, a signal processing circuit that emphasizes an image-capture signal output from the image-capturing device by implementing specific type of processing on the image-capture signal, a display device that displays an image corresponding to the image-capture signal or an image corresponding to the emphasized image-capture signal, and a control circuit that turns off the signal processing circuit when displaying an image captured by the image-capturing device at the display device following, at least, a shutter release.

BRIEF DESCRIPTION OF THE DRAWINGS

FIG. 2C is a rear view of the external appearance of the electronic still camera during a normal photographing operation;

FIG. 9A presents an example of an arrangement of primary color filters provided at the CCD;

FIG. 9B presents an example of an arrangement of complementary color filters provided at the CCD;

FIG. 17A shows the pixel arrangement in image data before undergoing an electronic zoom enlargement at a electronic zoom magnification of N=2;

FIG. 17B shows brightness data calculated by using the image data shown in FIG. 17A;

FIG. 17C shows the brightness signals corresponding to the four central pixels shown in FIG. 17B having undergone interpolation processing implemented at a magnification factor of 2 along both a vertical direction and the horizontal direction;

DESCRIPTION OF THE PREFERRED EMBODIMENTS

First Embodiment

Figure 1A:
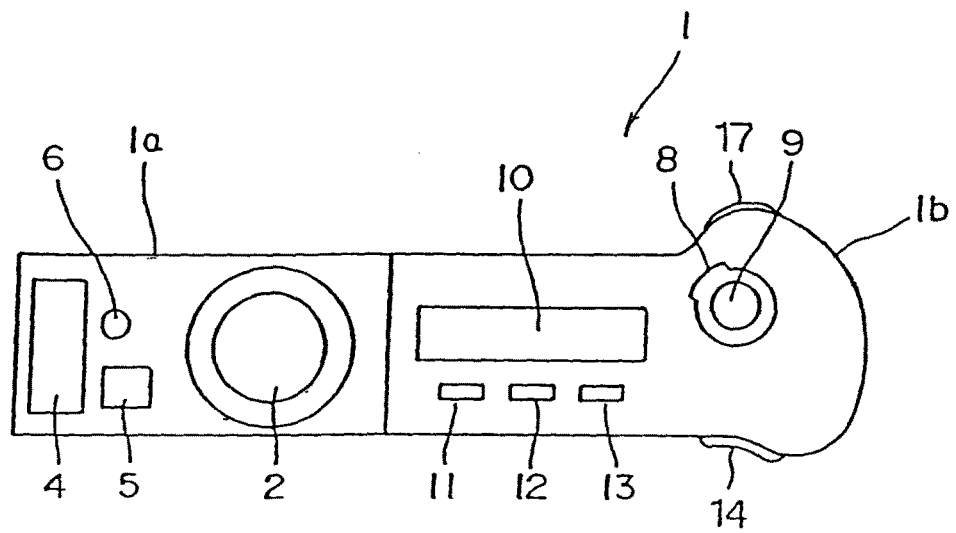
FIG. 1A is a top view of the external appearance of an electronic still camera in a storage or transportation state.
Figure 1B:
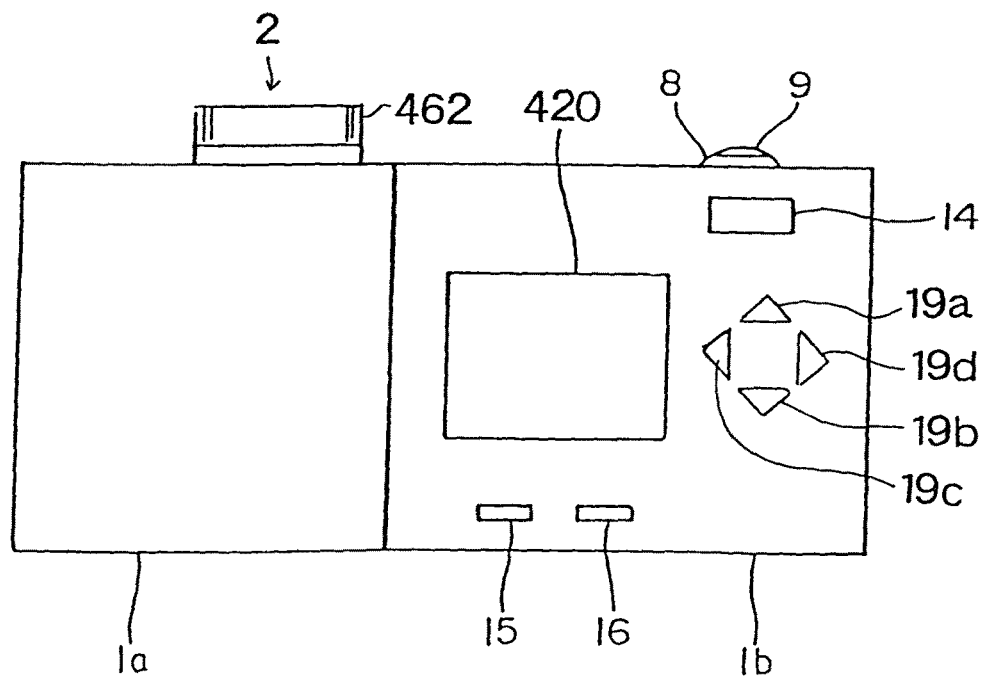
FIG. 1B is a rear view of the external appearance of an electronic still camera in a storage or transportation state.
Figure 2A:
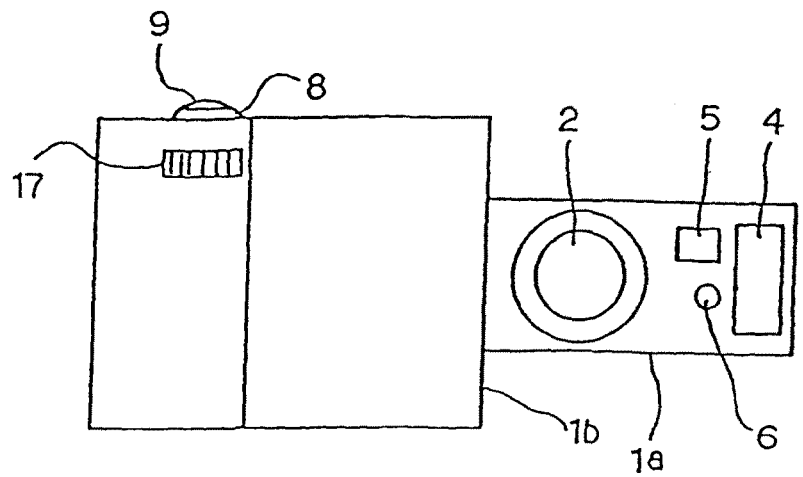
FIG. 2A is a front view of the external appearance of the electronic still camera during a normal photographing operation.
Figure 2B:
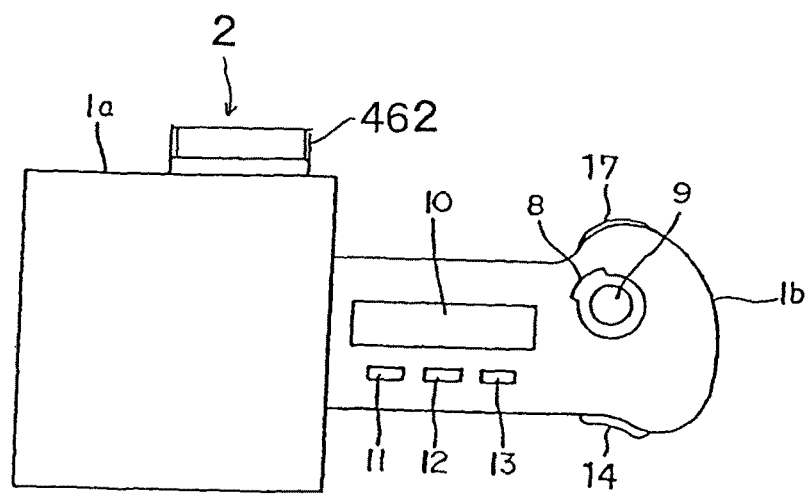
FIG. 2B is a top view of the external appearance of the electronic still camera during a normal photographing operation.

The following is an explanation of an embodiment of the present invention given in reference to the drawings. FIG. 1 presents the external appearance of the electronic still camera according to the first embodiment of the present invention in storage or in transportation with FIG. 1A presenting a top view and FIG. 1B presenting a rear view. In addition, FIG. 2 presents the external appearance of the camera shown in FIG. 1 during a normal photographing operation, with FIG. 2A presenting a front view, FIG. 2B presenting a top view and FIG. 2C presenting a rear view. The electronic still camera 1 in the embodiment is divided into a lens unit 1a which includes a movable lens 2 and a monitor unit 1b which includes a display LCD 420, with the two units 1a and 1b linked so as to allow rotation relative to each other.

As shown in FIG. 1, the lens unit 1a is rotated so as to allow the lens unit 1a and the monitor unit 1b to lie flat for storage and transportation. When performing a normal photographing operation, the lens unit 1a is rotated to allow the movable lens to turn toward the subject, as illustrated in FIG. 2. At this time, since the monitor unit 1b is held in such a manner that the display LCD 420 is turned toward the photographer, the photographer is able to perform the photographing operation while looking at the display LCD 420.

The lens unit 1a is provided with an electronic flash unit 4, a viewfinder window 5, a red-eye reduction • self timer indicator lamp 6, a viewfinder eyepiece window 7 and the like as well as the movable lens 2. The monitor unit 1b is provided with a main switch 8, a release button 9, a display panel 10, a flash photographing mode button 11, a photographing distance mode button 12, an image quality mode button 13, a zoom operation button 14, a monitor display button 15, a menu button 16, a selector dial 17, peaking area selection buttons 19a-19d and the like as well as the display LCD 420.

The electronic still camera 1 has two operating mode settings, i.e., a recording mode for recording image data obtained by capturing a subject image and a reproduction mode for reading out and reproducing recorded image data. Through a switching operation of the main switch 8, either the recording mode (REC) or the reproduction mode (PLAY) is selected. The main switch 8 may be set at one of at least four positions, PLAY, OFF, REC (S) and REC (C). The recording mode is an operating mode in which a captured subject image is recorded as image data, whereas the reproduction mode is an operating mode in which recorded image data are read out and displayed at the display LCD 420. There are two recording modes, i.e., REC (S) and REC (C), with (S) corresponding to a single frame photographing mode for taking pictures one frame at a time and (C) corresponding to a continuous shooting mode (or dynamic image mode) for performing a continuous frame photographing operation.

Figure 3:
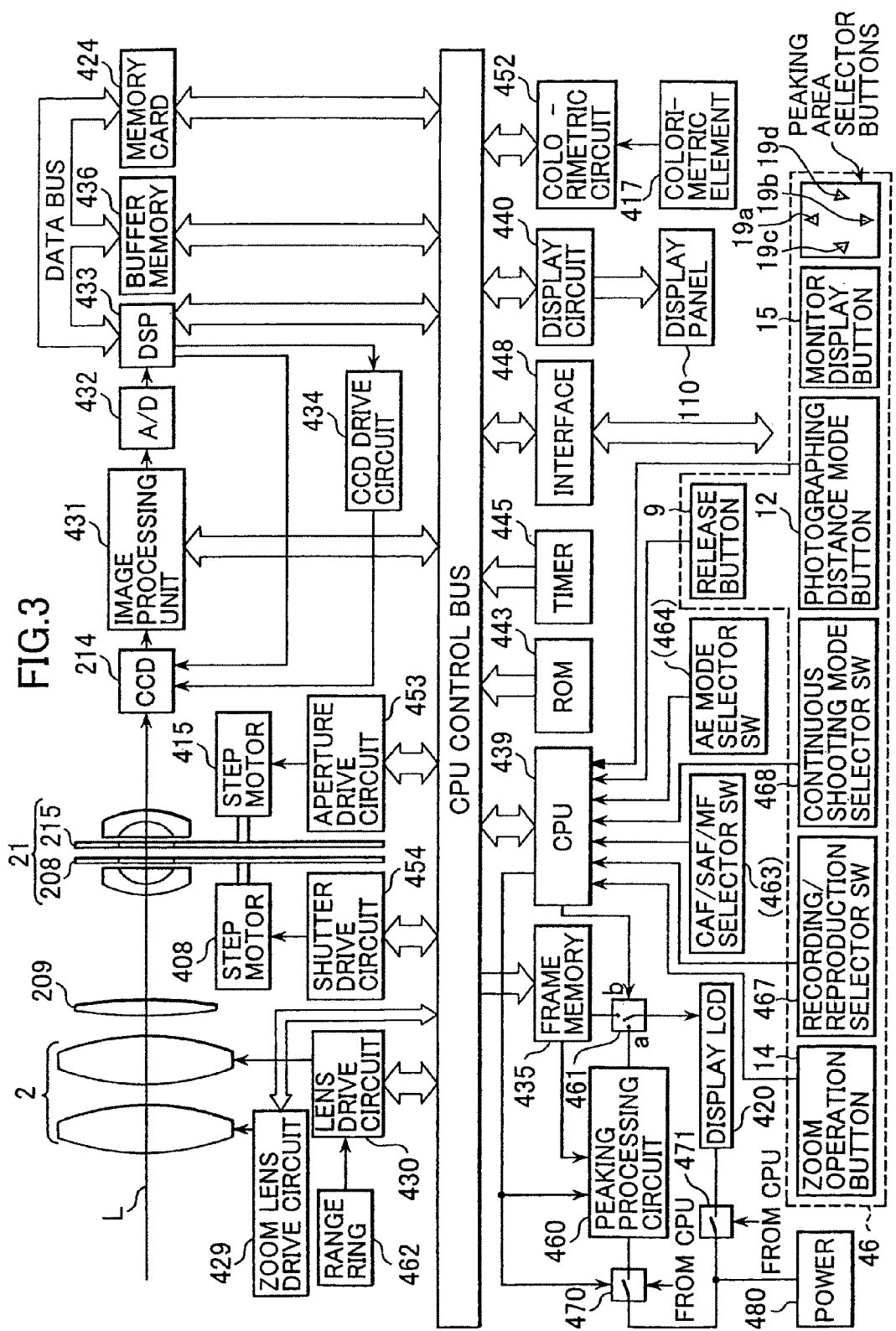
FIG. 3 is a circuit block diagram of the electronic still camera according to a first embodiment.

FIG. 3 is a block diagram of the circuits in the electronic still camera 1 according to the first embodiment. When the main switch 8 is set to the recording mode: REC (S), power to the electronic still camera 1 is turned on and a CPU 439 activates a control program stored in a ROM 443. A recording/reproduction selector switch 467 and a continuous shooting mode selector switch 468 operate by interlocking with the main switch 8, and when the main switch 8 is set to the REC (S) position, the recording/reproduction selector switch 467 is set to the recording mode and the continuous shooting mode selector switch 468 is set to the single frame photographing mode. The CPU 439 implements control on the individual blocks as necessary in response to operation signals input through operating members 46 such as the switches and the buttons described above.

In FIG. 3, subject light L enters the electronic still camera 1 after passing through the movable lens 2, and the incident subject light L passes through the movable lens 2, a fixed lens 209 and a lens group 21 to form an image on an image-capturing element 214. The image-capturing element 214, which is constituted of a CCD, implements photoelectric conversion to convert an optical image formed at each pixel to an electrical image signal. A digital signal processor (hereafter referred to as a DSP) 433 provides a horizontal drive signal to the CCD 214 and also provides a vertical drive signal to the CCD 214 by controlling a CCD drive circuit 434.

An image processing unit 431, which is controlled by the CPU 439, samples image signals having undergone the photoelectric conversion at the CCD 214 with specific timing and amplifies them to achieve a specific signal level. An analog/digital conversion circuit (hereafter referred to as the A/D conversion circuit) 432 converts amplified image signals output from the image processing unit 431 to digital signals, and outputs the digitized image data resulting from the digital conversion to the DSP 433. The DSP 433 implements image processing such as edge enhancement, gamma control and white balance adjustment on the image data output from the A/D conversion circuit 432.

In addition, the DSP 433 implements control on the data bus connected to a buffer memory 436 and a memory card 424 to temporarily store the image data having undergone the image processing in the buffer memory 436, and then reads out the stored image data from the buffer memory 436 to implement a specific type of format processing on them for JPEG compression on the like. The image data having undergone the format processing are then compressed at a specific rate through the JPEG method and are recorded at the memory card 424. Furthermore, the DSP 433 stores the image data having undergone the image processing described above in a frame memory 435 to display them on the display LCD 420 provided at the monitor unit 1*b* (see FIG. 2), or reads out and decompresses the photographic image data recorded in the memory card 424, stores the decompressed photographic image data in the frame memory 435 and displays them on the display LCD 420. The DSP 433 also engages in timing control for data input/output while recording the image data in the memory card 424 or recording the decompressed photographic image data into the buffer memory 436.

The image data obtained at the CCD 214 are stored in the buffer memory 436, to be utilized to reduce the difference in the speed at which image data are input/output at the memory card 424 and the difference in the processing speed between the CPU 439 and the DSP 433. A timer 445, which is internally provided with a clock circuit, outputs time data corresponding to the current time point to the CPU 439. The time data are recorded in the memory card 424 together with the image data.

Figure 4:
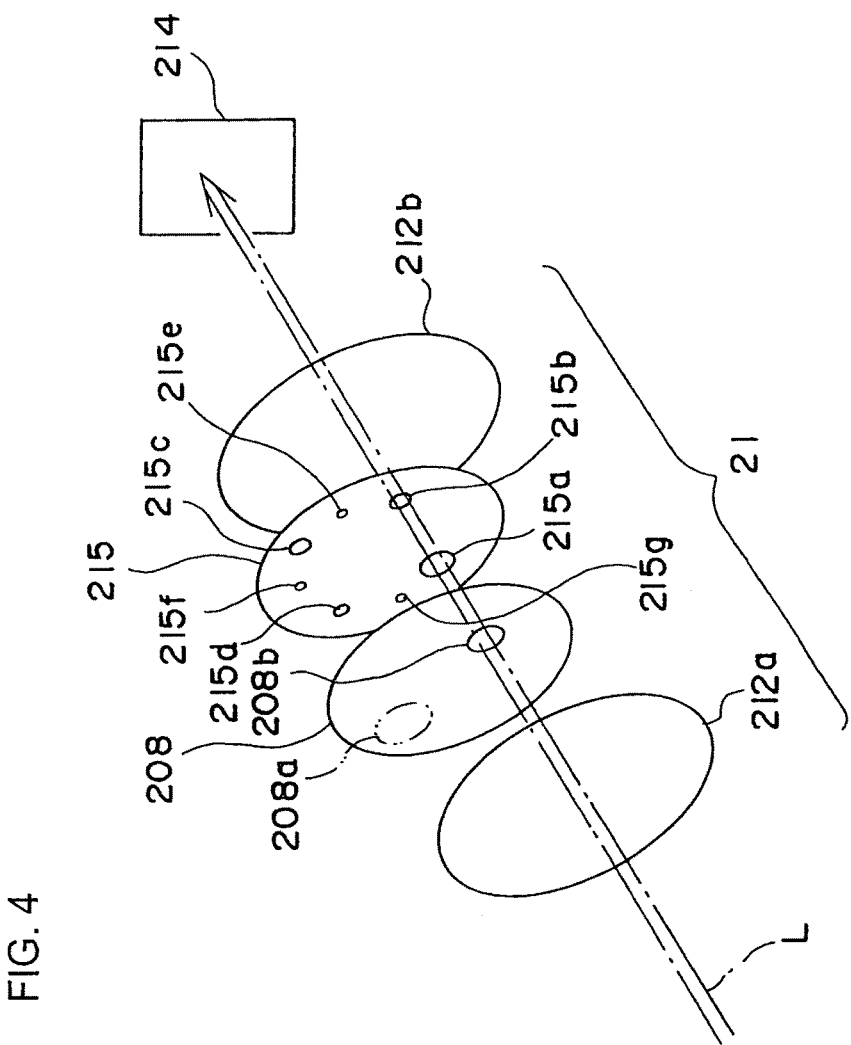
FIG. 4 is a perspective of the lens group.

FIG. 4 is a perspective of the lens group 21 mentioned earlier. Inside the lens group 21, an aperture plate 215 and a shutter plate 208 are provided next to each other, with relay lenses 212*a* and 212*b* enclosing the aperture plate 215 and the shutter plate 208. The aperture plate 215 and the shutter plate 208 are each formed in a disk shape, and are driven by step motors 408 and 415 (see FIG. 3) respectively provided at the centers of the rotation of the disks. As shown in FIG. 4, aperture openings 215*a*-215*g* are provided at the aperture plate 215. The opening areas of the aperture openings 215*b*-215*g* are set so that they are progressively halved from the opening 215*b* through the opening 215*g*, relative to the opening area of the opening 215*a* which allows the entire subject light flux to pass. At the shutter plate 208, a full light-blocking portion 208*a* which blocks the entire light flux and an opening 208*b* which allows the entire light flux to pass are provided.

An aperture drive circuit 453 in FIG. 3 drives the step motor 415 and sets the opening diameter at the aperture plate 215 so as to achieve the aperture value determined through a specific exposure calculation performed by the CPU 439 by using the brightness level of the subject detected in the image data output from the A/D conversion circuit 432 to the DSP 433. The aperture plate 215 sets an opening with the specific opening diameter on the optical path as the step motor 415 is driven. A shutter drive circuit 454 drives the step motor 408 to set the opening 208*b* at the shutter plate 208 in the optical path during an exposure operation at the CCD 214, and sets the full light-blocking portion 208*a* on the optical path when the exposure operation is completed. It is to be noted that the control of the exposure time is achieved through an electronic shutter operation which is to be detailed later.

A lens drive circuit 430 drives the movable lens 2 to the focus position in response to a command issued by the CPU 439. The lens drive circuit 430 is also capable of driving the movable lens 2 to the focus position in response to an operation signal from a range ring 462 instead of a command from the CPU 439. A zoom lens drive circuit 429 drives the movable lens 2 in response to a command issued by the CPU 439 to change the zoom magnification (focal length) of the movable lens 2.

A peaking processing circuit 460 reads out image data stored in the frame memory 435 in response to a command issued by the CPU 439 and implements the peaking processing to be detailed later on the image data thus read out. The image data having undergone the peaking processing are output to a terminal a of a switch 461. In response to a command issued by the CPU 439, the switch 461 allows either image data read out from the frame memory 435 and input through a terminal b of the switch 461 or the image data having undergone the peaking processing which have been output from the peaking processing circuit 460 and input through the terminal a of the switch 461 to be output to the display LCD 420.

In response to a command issued by the CPU 439, a switch 470 turns on/off the power to the peaking processing circuit 460 in conformance to the selected/cleared state of the peaking processing mode. The power supplied from a power source circuit 480 is turned on to engage the peaking processing circuit 460 in operation, whereas the power supplied from the power source circuit 480 is turned off when the peaking processing circuit 460 is not in operation. A switch 471, which is turned on/off in response to a command from the CPU 439 by interlocking with the operation of the monitor display button 15 (see FIG. 1), is provided to turn on/off the power supplied to the display LCD 420. The power supplied from the power source circuit 480 is turned on to engage the display LCD 420 in a display operation, whereas the power supplied from the power source circuit 480 is turned off when the display LCD. 420 is not engaged in a display operation. It is to be noted that other circuit blocks are individually supplied with power from the power source circuit 480 as long as the power is set to ON through the main switch 8.

A colorimetric element 417 detects the color temperature of the main subject and around the main subject and outputs data indicating the color temperature thus detected to a colorimetric circuit 452. The colorimetric circuit 452 converts an analog signal output by the colorimetric element 417 to a digital value by implementing a specific type of processing and outputs the digital signal resulting from the conversion to the CPU 439. An interface 448 is provided to connect a specific external device (not shown) to enable data exchange between the CPU 439 and the connected external device.

In addition, a display circuit 440 is connected to the CPU 439, to enable display of various setting statuses such as the flash mode setting at the flash unit 4 set through the flash photographing mode button 11, the distance range setting set through the photographing distance mode button 12 and the compression rate setting set through the image quality mode button 13 on the display panel 10.

—Peaking Processing—

Figure 5:
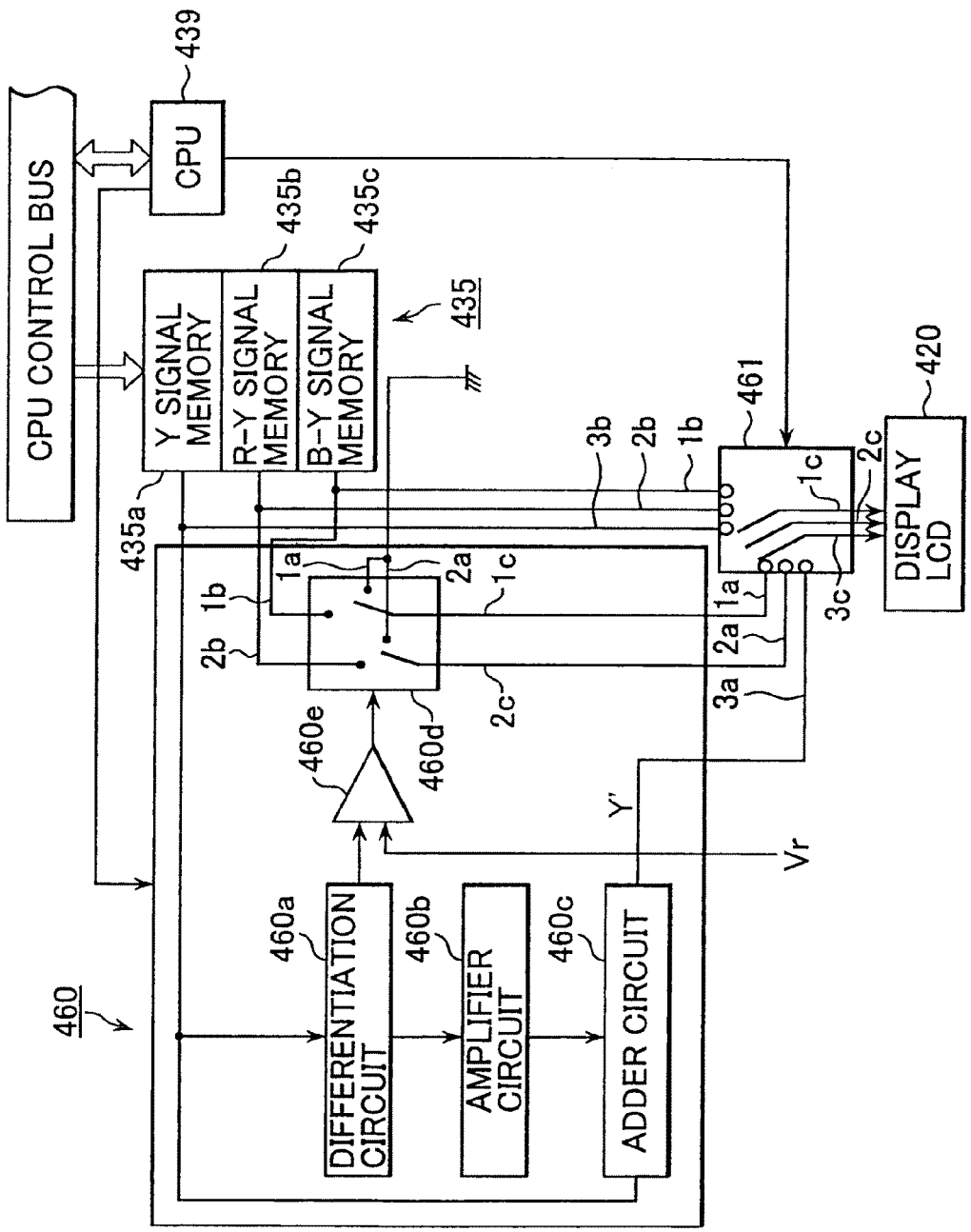
FIG. 5 illustrates in detail the peaking processing circuit, the switch and the frame memory.

The peaking processing is performed on the image data corresponding to a peaking area which is to be detailed later in the image data having undergone the image processing at the DSP 433 and stored in the frame memory 435 as described above. FIG. 5 illustrates in detail the peaking processing circuit 460, the switch 461 and the frame memory 435. The frame memory 435 is constituted of a Y signal memory 435a, in which a brightness signal Y in the image data is stored, and an R-Y memory 435b and a B-Y memory 435c in which a color difference signal R-Y and a color difference signal B-Y in the image data are respectively stored. The brightness signal Y, the color difference signal R-Y and the color difference signal B-Y are calculated by the DSP 433 and are stored in the frame memory 435. The peaking processing circuit 460 comprises a differentiation circuit 460a, an amplifier circuit 460b, an adder circuit 460c, an operational amplifier 460e and a 2-circuit switch 460d. The switch 461 is a 3-circuit switch, with the a-circuit side connected to the peaking processing circuit 460, the b-circuit side connected to the frame memory 435 and a common terminal connected to the display LCD 420. When the peaking processing mode is selected to implement peaking processing, the switch 461 is set to the a-circuit side in response to a command issued by the CPU 439. As the switch 461 is switched to the a-circuit side, various signals output from the peaking processing circuit 460 and input through terminals 1a-3a of the switch 461 are provided to the display LCD 420.

In FIG. 5, the brightness signal Y output from the Y signal memory 435a is input to the peaking processing circuit 460 and is differentiated at the differentiation circuit 460a in the peaking processing circuit 460. The differentiated signal resulting from the differentiating operation is then amplified at the amplifier circuit 460b and the amplified signal is added to the original brightness signal Y at the adder circuit 460c. A brightness signal Y' resulting from the adding operation is output from the peaking processing circuit 460 and is input through the terminal 3a of the switch 461.

The color difference signal R-Y and the color difference signal B-Y output from the R-Y signal memory 435b and the B-Y signal memory 436c are respectively input to a terminal 2b and a terminal 1b of the switch 460d in the peaking processing circuit 460. Both a terminal 2a and a terminal 1a of the switch 460d are connected to the ground (GND). The differentiated signal resulting from the differentiating operation at the differentiation circuit 460a is input to the operational amplifier 460e, and if the differentiated circuit thus input achieves a voltage higher than a specific voltage Vr input to the operational amplifier 460e, a drive signal for driving the switch 460d is output from the operational amplifier 460e to set the switch 460d to the a-circuit side. Since the a-circuit side of the switch 460d is connected to the ground as described above, the levels of the color difference signal R-Y and the color difference signal B-Y output from a common terminal 2c and a common terminal 1c of the switch 460d are both set to 0. Thus, a brightness signal Y' achieved by adding the differentiated signal to the original brightness signal is input to the terminal 3a of the switch 461, the color difference signal R-Y at level 0 is input to the terminal 2a of the switch 461 and the color difference signal B-Y at level 0 is input to the terminal 1a of the switch 461. As a result, white display in which the color over the area in which the value indicated by the differentiated signal of the brightness signal Y is larger than a specific value has been eliminated is brought up on the display LCD 420. In other words, a high contrast portion of the subject image such as an edge is emphasized in white at a high brightness level on the display.

If, on the other hand, the differentiated signal resulting from the differentiating operation at the differentiation circuit 460a has a voltage lower than the specific voltage Vr input to the operational amplifier 460e, no drive signal for driving the switch 460d is output from the operational amplifier 460e, and thus, the switch 460d is switched to the b-circuit side. As a result, the color difference signal R-Y and the color difference signal B-Y respectively output from the R-Y signal memory 435b and the B-Y signal memory 435c are output respectively from the common terminal 2c and the common terminal 1c of the switch 460d. Since these color difference signals and the brightness signal Y' achieved by adding the differentiated signal to the original brightness signal are provided to the display LCD 420, a low contrast portion of the subject image is displayed based upon the color difference signal R-Y and the color difference signal B-Y. The peaking processing operation described above is performed for each of the pixels displayed on the display LCD 420.

When the peaking processing is not to be implemented by the peaking processing circuit 460 with the peaking processing mode cleared, the switch 461 is switched to the b-circuit side in response to a command issued by the CPU 439. As the switch 461 is switched to the b-circuit side, the various signals output from the B-Y signal memory 435c, the R-Y signal memory 435b and the Y signal memory 435a and respectively input to the terminals 1b-3b of the switch 461 are provided to the display LCD 420.

As mentioned above, in the digital still camera 1, the recording mode (REC (S) or REC (C)) or the reproduction mode (PLAY) is selected through the recording/reproduction selector switch 467 operated by interlocking with the operation of the main switch 8. A menu setting mode for selecting/setting the camera operation is provided in both operating modes. Since the electronic still camera 1 according to the first embodiment is characterized by the camera operation set in the menu in the recording mode, the menu setting will be explained in reference to the recording mode.

—Recording Operation—

When the main switch 8 is switched to the recording mode: REC (S) position for performing a single frame photographing operation, the electronic still camera 1 is switched to the recording mode for single frame photographing as the power is turned on. In this recording mode, a halfway-press signal and a full-press signal are input to the CPU 439 respectively from halfway-press switch and a full-press switch (hereafter both switches being referred to as the release button 9) both interlocking with the release button 9. When a halfway-press signal is input through the release button 9, the CPU 439 detects the focal adjustment state of the movable lens 2 based upon the contrast in the image data obtained by the CCD 214. Then, it drives the movable lens 2 to the focus position so as to form an image of the subject light entering the movable lens 2 on the CCD 214 constituting the image-capturing device. In addition, when a halfway-press signal is input through the release button 9 to the CPU 439, the latter detects the brightness of the subject in the image data obtained at the CCD 214 and performs an exposure calculation based upon the detected brightness level.

When a zoom operation button 466 is operated, the zoom lens drive circuit 429 drives the movable lens 2 in response to a command issued by the CPU 439 to change the focal length. The focal length is switched to either the telephoto side (T) or the wide angle side (W) in correspondence to the side of the zoom operation button 14 which is currently depressed.

When the release button 9 is turned on in succession to the input of the halfway-press signal and a full-press signal is input to the CPU 439, the flash unit 4 emits light in correspondence to the results of the exposure calculation and the mode set in advance through the flash photographing mode button 11, and with the subject light L from the movable lens 2 forming an image on the light receiving surface of the CCD 214, a signal charge corresponding to the brightness level of the subject image is stored at the CCD 214. Timing control on the CCD 214 is implemented by the DSP 433 and the CCD drive circuit 434, to clear the signal charge stored at the CCD 214 with the drive pulses output by the two circuits, which is then input to the image processing unit 431 which includes a noise removal circuit and a DC reproduction circuit. An analog image signal having undergone analog processing such as noise removal and gain control at the image processing unit 431 is then converted to a digital signal at the A/D conversion circuit 432.

The digitized signal is guided to the DSP 433 where it undergoes image preprocessing such as edge enhancement and gamma control and is then temporarily stored in the buffer memory 436. The CPU 439 and the buffer memory 436 engage in image data exchange. After the white balance adjustment values are ascertained based upon the stored image data, a white balance adjustment is performed at the DSP 433 based upon the adjustment value and the image data having undergone the white balance adjustment are stored in the buffer memory 436 again. The image data stored in the buffer memory 436 are processed to generate display image data at the DSP 433 and with these image data written into the frame memory 435, a photographic image referred to as a freeze image, is displayed at the display LCD 420.

The image data having undergone the image pre-possessing described earlier further undergo format processing (image post-processing) at the DSP 433 in preparation for JPEG compression, are compressed at a specific rate through the JPEG method, are assigned with a specific data name by the CPU 439 and are recorded together with the time information output from the timer 445 into a recording medium (PC card, CF card or the like) 424 such as a flash memory.

—Menu Setting—

Figure 6A:
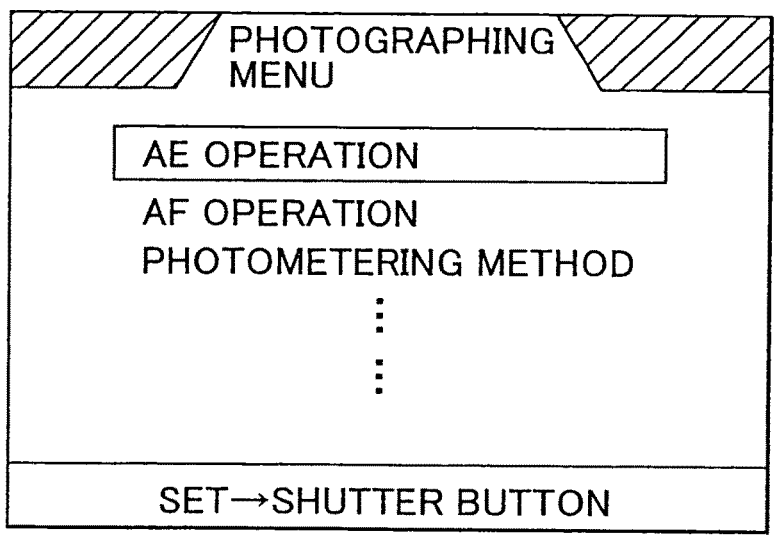
FIG. 6 illustrates an AE operation setting in the menu setting screen.
Figure 6B:
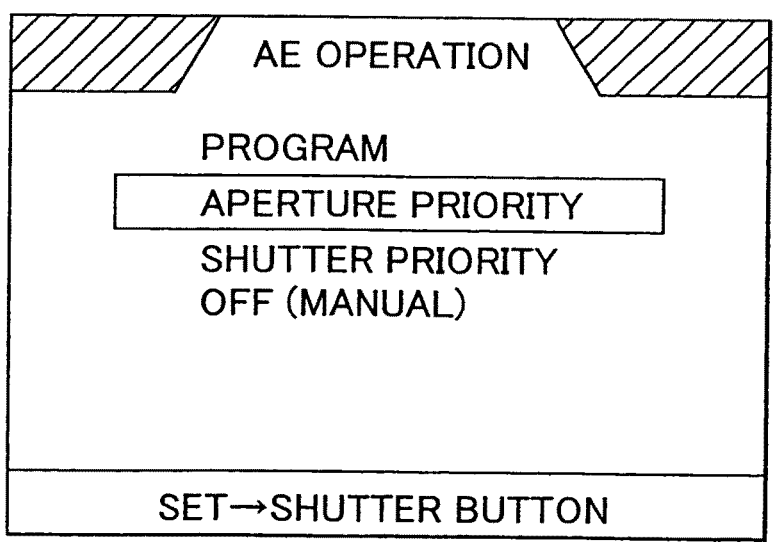

FIG. 6 presents the recording mode menu setting screens displayed on the display LCD 420 of the electronic still camera 1. When the menu button 16 shown in FIG. 1 is pressed in the recording mode, the menu setting screen shown in FIG. 6A is displayed on the display LCD 420 of the electronic still camera 1. By operating the selector dial 17 or the zoom operation button 14 (which functions as a selector switch in the menu setting mode), an item "AE operation" for instance, in the menu is selected, and when the selection of "AE operation" is confirmed by pressing the release button 9 (which functions as a selection confirmation switch in the menu setting mode), the menu setting screen for the AE operation mode shown in FIG. 6B is brought up on the display LCD 420. The AE operation mode, which relates to an exposure calculation performed by the CPU 439, includes a "program mode" in which the aperture value and the shutter speed (i.e. exposure time) are determined in conformance to preset conditions in correspondence to the detected brightness value of the subject, an "aperture priority mode" in which the shutter speed is determined in correspondence to the detected brightness value of the subject and the aperture value that is currently set, a "shutter priority mode" in which the aperture value is determined in correspondence to the detected brightness value of the subject and the shutter speed which is currently set, and "off (manual mode)" in which the photographer selects the aperture value and the shutter speed.

By operating the selector dial 17 or the zoom operation button 14, the item "aperture priority mode," for instance, in the menu is selected. When the release button 9 is pressed to confirm the selection of the item "aperture priority mode", the operating mode in which the shutter speed is determined in correspondence to the detected brightness value and the current aperture value setting is selected.

Figure 7A:
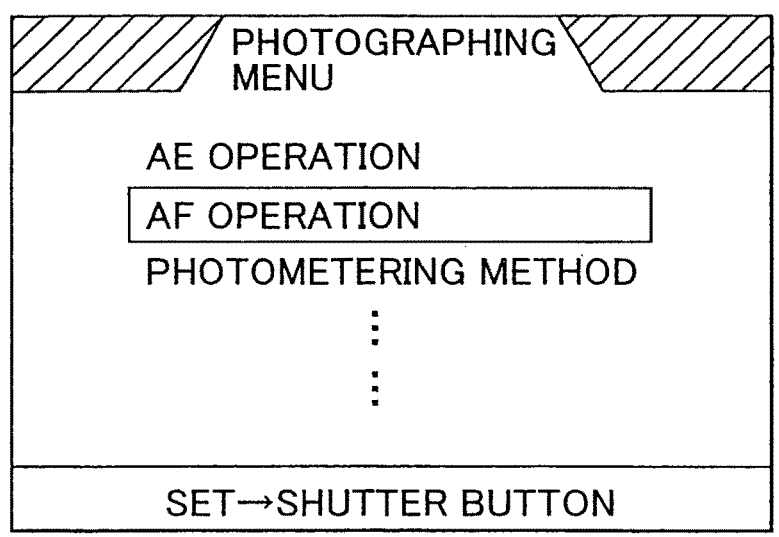
FIG. 7 illustrates an AF operation setting in the menu setting screen.
Figure 7B:
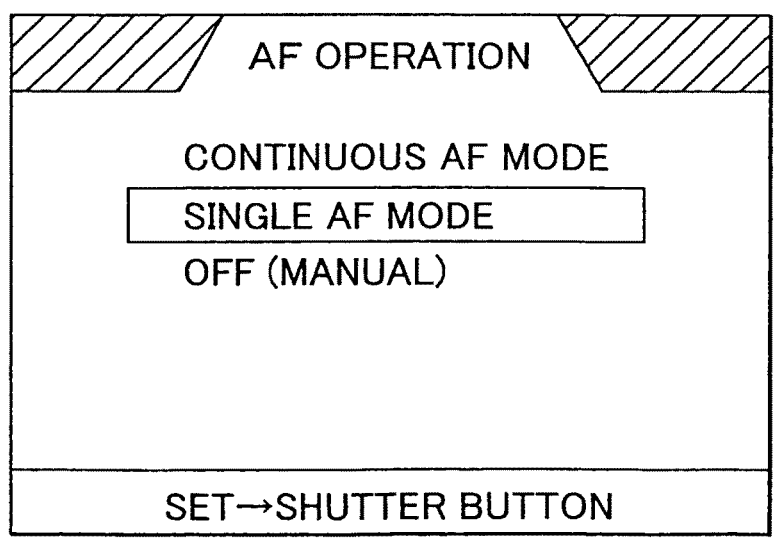

In addition, if the item "AF operation" in the menu is selected by operating the selector dial 17 or the zoom operation button 14 (see FIG. 7A) and the selection of the "AF operation" is confirmed by pressing the release button 9, the menu setting screen related to the AF operation mode as shown in FIG. 7B is brought up on the display LCD 420. The AF operation mode includes a "continuous AF mode" in which a focal point detection operation is performed at all times while the camera is set in the recording mode through the main switch 8, a "single AF mode" in which a focal point detection operation is performed only when a halfway-press signal is input to the CPU 439 through the release button 9 and "off (manual mode)" whereby the photographer manually performs a focusing operation without the electronic still camera 1 engaging in a focal point detection operation.

By operating the selector dial 17 or the zoom operation button 14, the item "single AF mode" is selected from the menu. If the selection of the item "single AF mode" is confirmed by pressing the release button 9, the operating mode in which a focal point detection is performed only when a halfway-press signal is input to the CPU 439 is selected.

These settings selected in the menus become valid when the menu button 16 is pressed again to allow the operation to return to the recording mode from the menu setting mode.

The menu settings explained above are used to achieve detailed settings for a camera operation related to photographing functions such as the exposure correction, the photometering method and the selection of the white balance adjustment value in addition to the selection of the AE mode and the AF mode. In the menu setting mode, the menu screen shown in FIG. 6 or 7 is displayed on the display LCD 420 and the subject image captured through the movable lens 2 is not displayed.

—Subsampling Readout—

The display LCD 420 is a compact liquid crystal display provided at the monitor unit 1*b* of the electronic still camera 1 as shown in FIG. 1, and has a smaller number of display pixels compared to the entire number of pixels through which an image is captured at the CCD 214. Accordingly, when displaying the subject image captured at the CCD 214 on the display LCD 420, the stored charges at the CCD are subsampled at a specific ratio corresponding to the display resolution of the display LCD 420 and the subsampled charges are read out.

Figure 8:
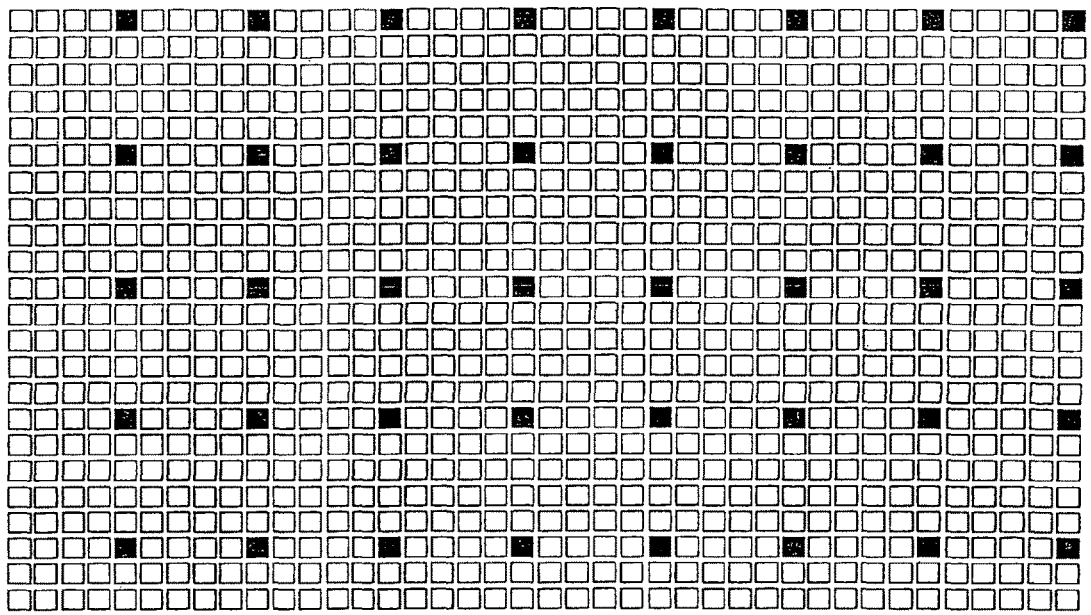
FIG. 8 shows the array of pixels constituting a subject image captured at the CCD and the subsampled pixels that are read out.

FIG. 8 illustrates the arrangement of pixels constituting the subject image captured at the CCD 214 and the subsampled pixels which are read out to display the subject image on the display LCD 420. In FIG. 8, the pixels that are blacked out indicate the subsampled pixels that are read out to display the subject image on the display LCD 420, and they are read out at, for instance, a rate M=5, i.e., at the rate of one pixel in every five pixels along the vertical direction and the horizontal direction in the pixels with which an image-capturing operation is performed at the CCD 214.

Color filters provided on the CCD 214 to capture a color image may be R, G and B primary color filters arranged in a Bayer array as shown in FIG. 9A or a G, Ye, Cy and Ma complementary color filters arranged as shown in FIG. 9B. In either of the arrangements in FIGS. 9A and 9B, the array order of the color filters corresponding to subsampled data that are read out can be matched with the array order of the color filters on the CCD 214 before the subsampling process (the Bayer array is sustained) by subsampling pixels over 2-pixel intervals, 4-pixel intervals or the like, i.e., over intervals corresponding to a number of pixels that is a multiple of 2 along the vertical and horizontal directions and reading out the subsampled pixels, and thus, the color before the subsampling process is reproduced even after the subsampling process. In FIGS. 9A and 9B, shaded pixels indicate the positions of pixels that are read out at the rate of one pixel in every five pixels.

The subsampling readout described above is implemented by the image processing unit 431 controlled by the CPU 439. In other words, the image processing unit 431 samples the image signal output by the CCD 214 with specific timing corresponding to the resolution of the display at the display LCD 420 to achieve a subsampling readout of the subject image captured by the CCD 214.

The subsampling readout explained above is implemented in the so-called electronic viewfinder mode for implementing through-image display of the subject image captured at the CCD 214 when displaying the subject image having undergone the peaking processing described earlier on the display LCD 420, for instance. When a full-press signal is input through the release button 9 as in the recording operation described earlier, all the stored charges resulting from the image-capturing operation performed at the CCD 214 are read out without being subsampled.

—Peaking Area Selection—

Figure 10:
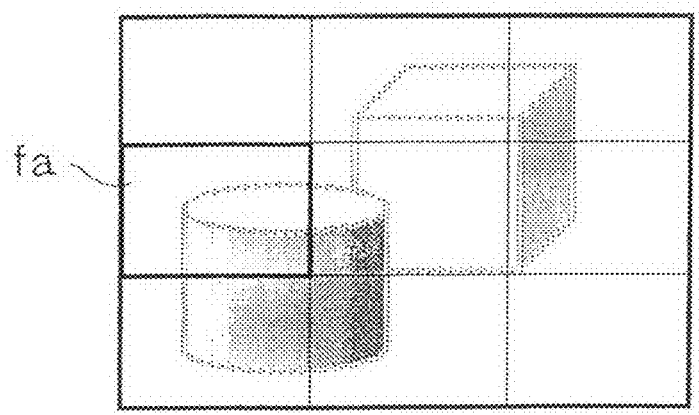
FIG. 10A presents an example of a division in which the visual field to be captured as an image is split into nine peaking areas.
FIG. 10B illustrates a focused state.
FIG. 10C illustrates a state achieved through peaking processing.

The peaking processing described above is performed on a subject image over a specific area (hereafter referred to as a peaking area) in the photographed subject image, selected from a plurality of areas achieved by dividing the photographic field. FIG. 10, which shows a subject image displayed on the display LCD 420, presents an example in which the photographic field captured in the electronic still camera 1 is split into nine peaking areas. When a halfway-press signal is input through the release button 9, a peaking area fa is selected as an area to undergo the peaking processing from the total of nine areas obtained by dividing the photographic field into three equal portions along the vertical direction and the horizontal direction as shown in FIG. 10A and is indicated with a bold frame. The peaking area fa which is initially indicated with the bold frame when the halfway-press signal is input through the release button 9 is the area that was selected when a halfway-press signal was previously input through the release button 9.

The peaking area selection buttons 19*a*-19*d* are used to change the peaking area fa indicated with the bold frame. If the peaking area selection button 19*a* is pressed, the peaking area fa is switched to the area one position above the currently set area in FIG. 10A, whereas the peaking area fa is switched to the area one position below than the currently set area by pressing the peaking area selection button 19*b*. Likewise, if the peaking area selection button 19*c* is pressed, the peaking area fa is switched to the area one position to the left relative to the currently set area, whereas the peaking area fa is switched to the area one position to the right relative to the currently set area by pressing the peaking area selection button 19*d*.

The peaking area fa explained above is utilized as an area over which a detection operation (autofocus: AF) to automatically detect the focus position adjustment state of the movable lens 2 to be detailed later is performed as well as for the peaking processing. It is to be noted that the peaking area fa is utilized regardless of whether the electronic still camera 1 is set in the autofocus mode for performing an AF operation or in a manual focus mode in which the photographer performs a manual focusing operation. The image information corresponding to the peaking area fa set through the peaking area selection buttons 19*a*-19*d* is stored in the CPU 439, and is read out from the CPU 439 to be displayed in a bold frame on the display LCD 420 when a halfway-press signal is input through the shutter release button 9. It is to be noted that the framed implemented display in response to the halfway-press signal is cleared when a specific length of time has elapsed after the input of the halfway-press signal.

—Focal Adjustment State Detection—

Figure 10B:
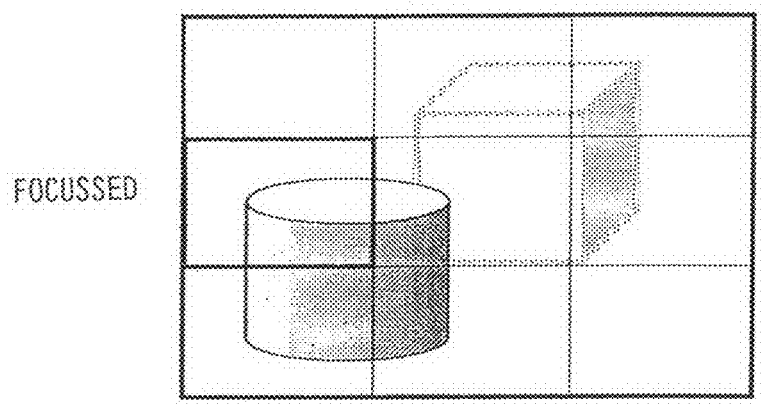
Figure 10:
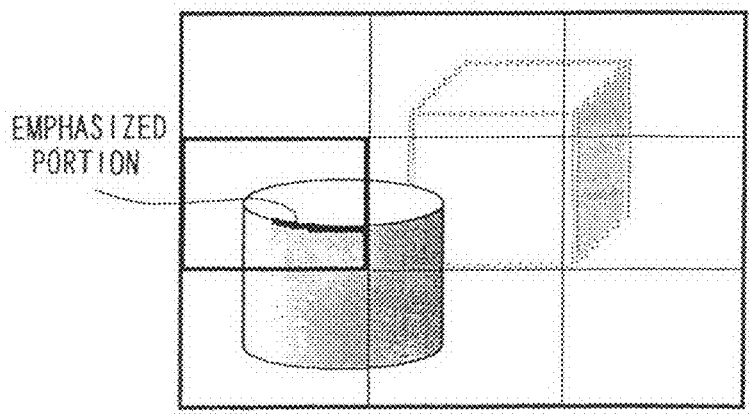
Figure 11:
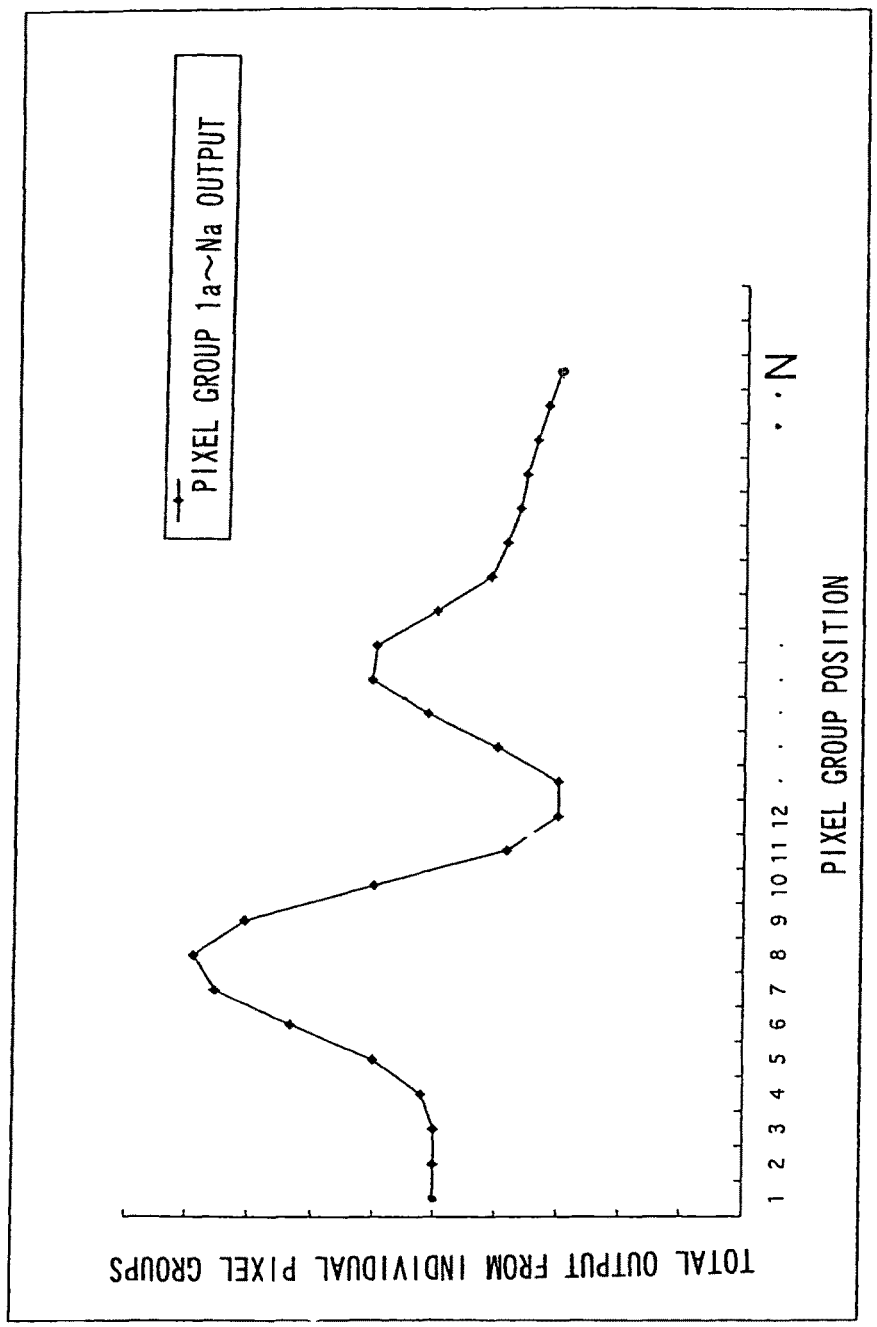
FIG. 11 illustrates the relationship between the positions of the individual pixels detected on the CCD and the output values of the pixels.

The AF operation in the autofocus mode is performed as described below. When the subsampled image-capture signals among the image-capture signal resulting from the image-capturing operation at the CCD 214 are read out as shown in FIG. 8, the contrast is detected from the image-capture signal corresponding to the preset peaking area fa and the focus position adjustment state achieved by the movable lens 2 is detected based upon the contrast thus detected. FIG. 11 presents a graph indicating the relationship between the positions of the pixels on the CCD 214 corresponding to the preset peaking area fa and the output values at the pixels. In the graph, which presents a curve corresponding to the subject image, the larger the change manifesting in the curve, the higher the contrast of the subject image. Thus, the focus position adjustment state is detected through the so-called scaling method and the focus position is adjusted with the movable lens 2 to achieve focus by driving the lens drive circuit 430, so as to maximize the contrast of the subject image. FIG. 10B shows the subject image in focus and displayed on display LCD 420. If the focused subject image is set to undergo peaking processing before it is displayed on the display LCD 420, the peaking processing is implemented on the peaking area fa alone, as shown in FIG. 10C. It is to be noted that the portion emphasized through the peaking processing is indicated by the bold line (which does not include the frame enclosing the peaking area fa) in FIG. 10C.

Figure 12:
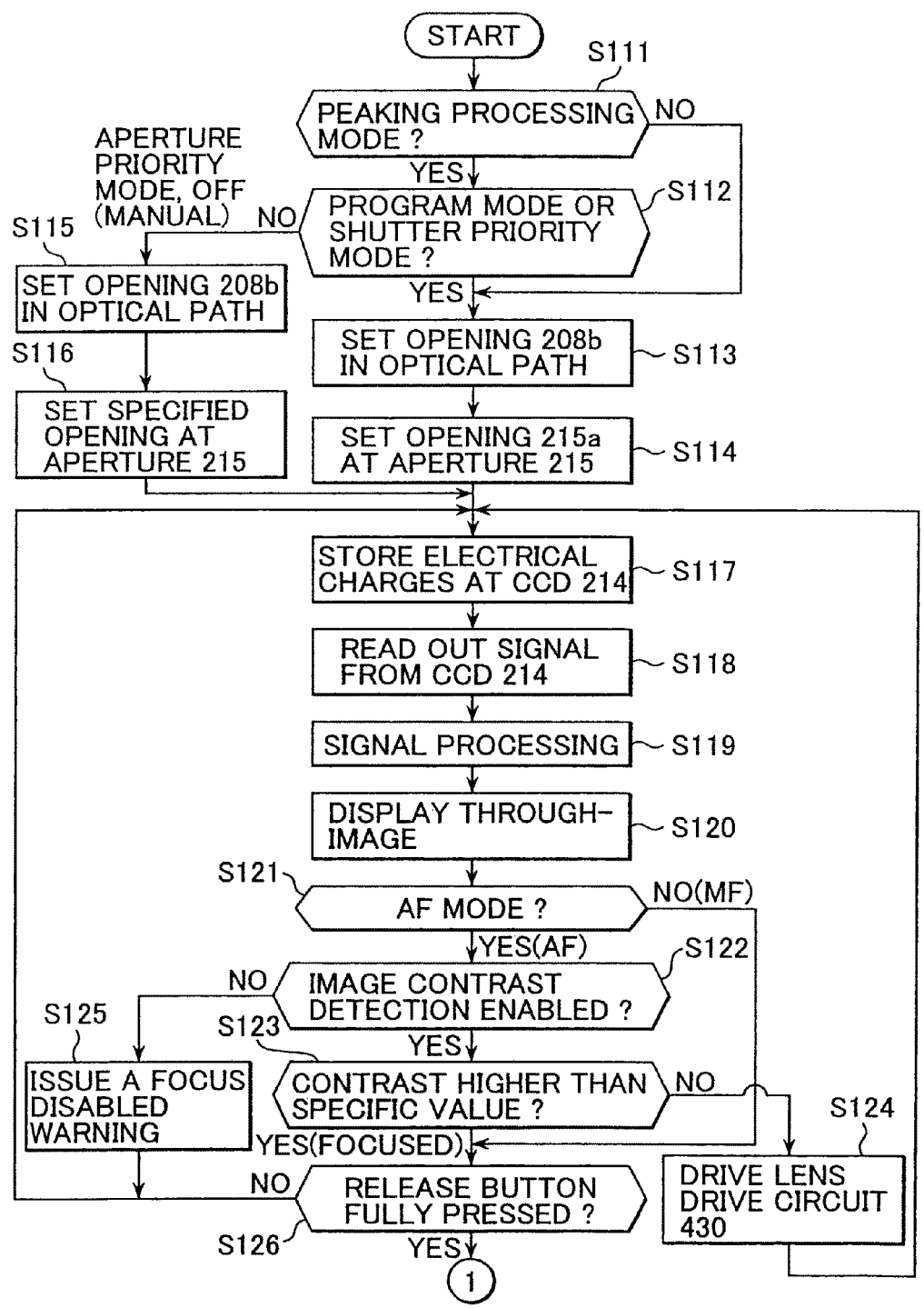
FIG. 12 is a flow chart of the first half of the photographing processing started up in response to a halfway-press signal in the first embodiment.
Figure 13:
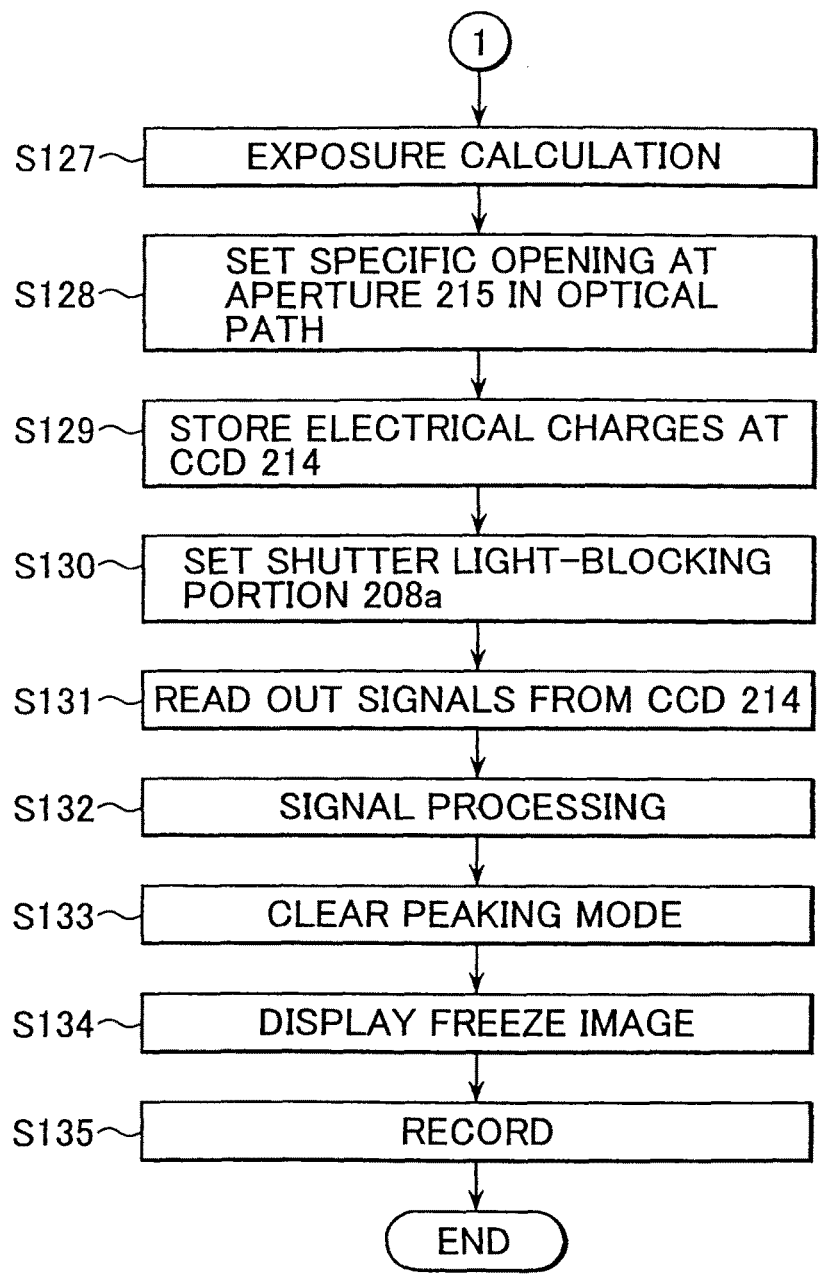
FIG. 13 is a flow chart continuing from the flow chart shown in FIG. 12, corresponding to the second half of the photographing processing.

An explanation is given on the photographing processing implemented in the recording mode in the electronic still camera 1 structured as described above. FIGS. 12 and 13 present a flow chart of the program started up in response to a halfway-press signal input through the release button 9. The halfway-press signal and a full-press signal are both input to the CPU 439 by operating the release button 9. In step S111, a decision is made as to whether or not the peaking processing mode has been set, and if a negative decision is made in step S113 (step S111 N), the operation proceeds to step S113. If an affirmative decision is made in step S111 (step S111 Y), the operation proceeds to step S112 to make a decision as to whether or not either the program mode or the shutter priority mode has been selected for the AE operation mode. If an affirmative decision is made in step S112 (if the program mode or the shutter priority mode has been set for the AE operation mode), the operation proceeds to step S113 in which the shutter plate 208 is driven to set the opening 208*b* on the shutter plate 208 in the optical path. In step S114, the aperture plate 215 is driven to set the full opening 215*a* at the aperture plate 215 in the optical path to implement open aperture control. After the open aperture control is achieved, the operation proceeds to step S117.

If a negative decision is made in step S112 (if the aperture priority mode has been selected for the AE operation mode or the AE operation mode is turned off (manual mode)), the operation proceeds to step S115 in which the shutter plate 208 is driven to set the opening 208*b* of the shutter plate 208 in the optical path. In step S116, the aperture plate 215 is driven to achieve the aperture value set by the photographer and with a specific opening at the aperture plate 215 set in the optical path, the aperture is reduced.

In step S117, electrical charges are stored at the CCD 214 to capture the subject image. In step S118, the stored charges at the CCD 214 are subsampled at a specific rate corresponding to the display resolution set for the display LCD 420 and the charges that remain subsampled are read out, to read out image data based upon the image signals resulting from the image-capturing operation.

In step S119, the image data thus read out undergo analog processing at the image processing unit 431 and after they are converted to digital signals at the A/D conversion circuit 432, a specific type of image processing is implemented on them at the DSP 433. The image data having undergone the image processing are written into the frame memory 435 in step S120, and thus, a through-image is displayed on the display LCD 420. During this process, if the peaking processing mode is set to implement peaking processing, the switch 461 is set to the a-circuit side in response to a command issued by the CPU 439 and, as a result, portions of the subject image achieving high contrast such as the edge are emphasized in white at a high brightness level in the displayed image.

In step S121, a decision is made as to whether or not the autofocus (AF) mode has been selected, and if an affirmative decision is made, the operation proceeds to step S122, whereas if a negative decision is made, the operation proceeds to step S126. In step S122, a decision is made as to whether or not contrast can be detected in the image data. If it is decided that contrast can be detected (step S122 Y), the operation proceeds to step S123, whereas if it is decided that contrast cannot be detected (step S122 N), the operation proceeds to step S125 to display a warning indicating that the image cannot be focused on the display panel 10 via the display circuit 440 before the operation returns to step S117.

In step S123, a decision is made as to whether or not the contrast detected in the image data achieves a value higher than a specific value. If a negative decision is made (step S123 N), the operation proceeds to step S124 to adjust the focus position of the movable lens 2 by driving the lens drive circuit 430. If, on the other hand, an affirmative decision is made (step S123 Y), it is assumed that the image has been focused and the operation proceeds to step S126. If it is decided in step S126 that a full-press signal has been input (step S126 Y), the photographing sequence leading to step S127 is executed. If, on the other hand, it is decided that no full-press signal has been input (step S126 N), the operation returns to step S117.

In step S127, the brightness value of the subject is calculated based upon the image data and an exposure calculation is performed. In step S128, a specific opening at the aperture plate 215 is set in the optical path and the amplification factor at which the image signal is amplified at the image processing unit 431 is changed from the setting effective at the time of the focal point detection to a specific setting for the photographing operation. In addition, the electrical charges stored at the CCD 214 are cleared and a so-called electronic shutter operation is implemented. In this context, the specific opening at the aperture plate 215 is the opening corresponding to the aperture value set by the photographer if the AE operation mode is set to the aperture priority mode or the AE operation mode is turned off (manual mode), whereas it corresponds to the aperture value determined through the exposure calculation performed in step S127 if the AE operation mode is set to the program mode or the shutter priority mode. In step S129, the CCD 214 is exposed over a specific length of time and electrical charges are stored, thereby capturing the subject image. The length of the exposure time is controlled so as to ensure that the length of time elapsing after the electrical charges are cleared in step S128 until the optical path becomes blocked by the shutter plate 208 in step S130 to be detailed later matches the exposure period determined through the exposure calculation performed in step S127. When the exposure is completed, the full light-blocking portion 208*a* at the shutter plate 208 is set in the optical path in step S130. By reading out the stored charges from the CCD 214 without subsampling, the image data based upon the image signals resulting from the image-capturing operation are read out in step S131.

In step S132, the image data thus read out undergo analog processing at the image processing unit 431, and after they are converted to digital signals at the A/D conversion circuit 432, image processing is performed on them at the DSP 433. In step S133, the peaking processing mode is cleared and the peaking processing circuit 460 is turned off. With the image data having undergone the image processing being written into the frame memory 435 in step S134, a freeze image which has not undergone peaking processing is displayed on the display LCD 420. In step S135, the data having undergone the image processing are compressed in a specific format and then are recorded at the memory card 424. When the processing described above is completed, the sequence of the photographing processing in FIGS. 12 and 13 ends.

—Reproduction Operation—

When the main switch 8 is set to the reproduction mode: PLAY position, the power to the electronic still camera 1 is turned on and, at the same time, the electronic still camera 1 is switched to the reproduction mode. If there are image data recorded at the recording medium 424 such as a memory card, the image data most recently recorded at the memory card among the recorded image data are read out to the CPU 439. After the image data thus read out are sent to the buffer memory 436, they are processed to generate display image data by the DSP 433 and are displayed as a reproduction image 1-1 as shown in FIG. 14 on the display LCD 420.

If there are a plurality of sets of image data recorded at the recording medium 424, the image data corresponding to the frame immediately preceding the frame of the display image currently on display, i.e., the set of image data recorded one frame earlier in the time sequence, are read out from the recording medium 424 and are displayed on the display LCD 420 (the image 2-1 shown in FIG. 14) through an operation at the peaking area selection button 19*b* (which functions as a frame rewind switch in the reproduction mode). Subsequently, each time the peaking area selection button 19*b* is operated, a frame of the image data to be reproduced is rewound, so that the data recorded immediately before the image data currently on display at the display LCD 420, e.g., the image 3-1, the image 4-1 ... shown in FIG. 14, are read out and displayed on the display LCD 420. If the peaking processing button 19*b* is operated again after the image data for all the frames are reproduced and displayed, the image data corresponding to the image 1-1 that were initially read out are read out from the recording medium 424 again and are displayed on the display LCD 420.

The image data corresponding to the frame immediately following the frame of the display image currently on display, i.e., the set of image data recorded one frame later in the time sequence, are read out from the recording medium 424 and are displayed on the display LCD 420 through an operation at the peaking area selection button 19a (which functions as a frame feed switch in the reproduction mode). For instance, if the image 3-1 is currently on display in FIG. 14, by operating the peaking area selection button 19a once, the image 2-1 is read out from the recording medium 424 and is displayed on the display LCD 420. Subsequently, each time the peaking area selection button 19a is operated, a frame feed of the image data to be reproduced is performed, so that the data recorded immediately after the image data currently on display at the display LCD 420, e.g., the image 2-1, the image 1-1 . . . shown in FIG. 14, are read out and displayed on the display LCD 420.

Figure 14:
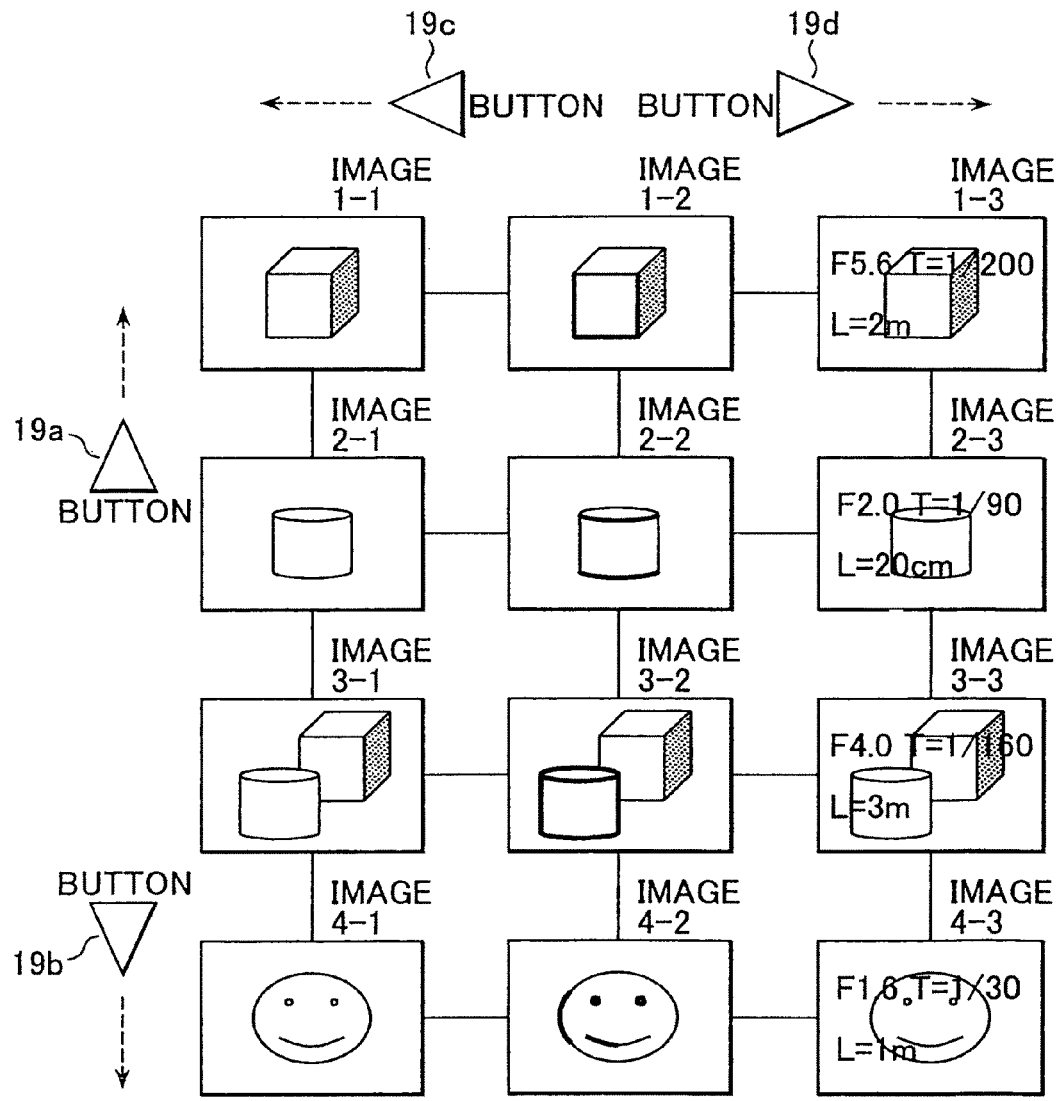
FIG. 14 presents reproduced images displayed in the reproduction mode.

In FIG. 14, if the peaking area selection button 19d (which functions as a display selector switch in the reproduction mode) is operated while the image 2-1 is on display, the peaking processing mode is selected and an image 2-2 with image areas achieving high contrast emphasized through the peaking processing is brought up on the display LCD 420. If the peaking area selection button 19d is operated again, the peaking processing mode is cleared, and an image 2-3 having recording information such as the shutter speed, the aperture value, the photometric value and the distance to the subject superimposed on the image not having undergone the peaking processing is displayed.

If the peaking area selection button 19c (which functions as a display selector switch in the reproduction mode) is operated while the image 2-3 is on display in FIG. 14, the display of the recording information such as the shutter speed, the aperture value, the photometric value and the distance to the subject superimposed on the image is cleared, and the image 2-2 having undergone the emphasis processing in the peaking processing mode is displayed on the display LCD 420. If the peaking area selection button 19c is operated once again, the peaking processing mode is cleared and the image 2-1 is displayed.

The frame rewind switch and the frame feed switch may be operated while displaying an image having undergone peaking processing (an image *-2 in FIG. 14) or an image upon which recording information is superimposed (an image *-3 in FIG. 14) by operating the display selector switch. In this context, an image *-2 may be any one of the images 1-2, 2-2, 3-2 and 4-2, resulting from the emphasis processing implemented in the peaking processing mode. An image *-3 may be any one of the images 1-3, 2-3, 3-3 and 4-3 each having the recording information superimposed on the image in a state in which the peaking processing is cleared. For instance, by operating the peaking area selection button 19b (which functions as the frame rewind switch in the reproduction mode) while the image 3-3 in FIG. 14 is on display, the image data in the frame immediately preceding the frame of the display image currently on display, i.e., the image data recorded one frame earlier in the time sequence, are read out from the recording medium 424, and are displayed on the display LCD 420 with a recording information such as the shutter speed, the aperture value, the photometric value and the distance to the subject superimposed (the image 4-3 shown in FIG. 14).

In addition, by operating the peaking area selection button 19a (which functions as the frame feed switch in the reproduction mode) while the image 2-2 shown in FIG. 14 is on display, the image data in the frame immediately succeeding the frame of the display image currently on display, i.e., the image data recorded one frame later in the time sequence, are read out from the recording medium 424 and the image 1-2 having undergone the peaking processing is displayed on the display LCD 420.

As explained above, by operating the peaking area selection button 19a or 199b, images in any of the image groups 1-*~4-* shown in FIG. 14 are read out from the recording medium 424 one frame at a time, and by operating the peaking area selection buttons 19c and 19d, images having undergone peaking processing and images having the recording information superimposed such as the images *-1~*-3 shown in FIG. 14 can be displayed. In this context, an image 1-* represents one of the images 1-1, 1-2, 1-3 and 4-1 shown in FIG. 14. In addition, an image *-1 represents one of the images 1-1, 2-1 and 3-1 shown in FIG. 14. It is to be noted that in the peaking display implemented in the reproduction mode, all the image areas with high contrast over the entire image to be displayed on the display LCD 420 are emphasized, regardless of the setting of the peaking area fa for the recording mode.

In the reproduction mode, information on the display selected through the display selector switch indicating which display mode among the three display modes, i.e., (1) the image data read out from the recording medium 424 are directly displayed, (2) image data achieved by implementing peaking processing on the image data read out from the recording medium 424 are displayed and (3) image data read out from the recording medium 424 are displayed with recording information such as the shutter speed, the aperture value, the photometric value and the distance to the subject superimposed, has been selected is stored in the CPU 439. When the operation shifts from the reproduction mode to the recording mode through an operation of the main switch 8, the transition is made after the display information described above is stored in the CPU 439, and the peaking processing and the superimposed display are temporarily cleared at the point in time at which the operation has shifted to the recording mode. To implement peaking processing in the recording mode, the peaking processing mode is set in conformance to the conditions for implementing the peaking processing described above.

Figure 15:
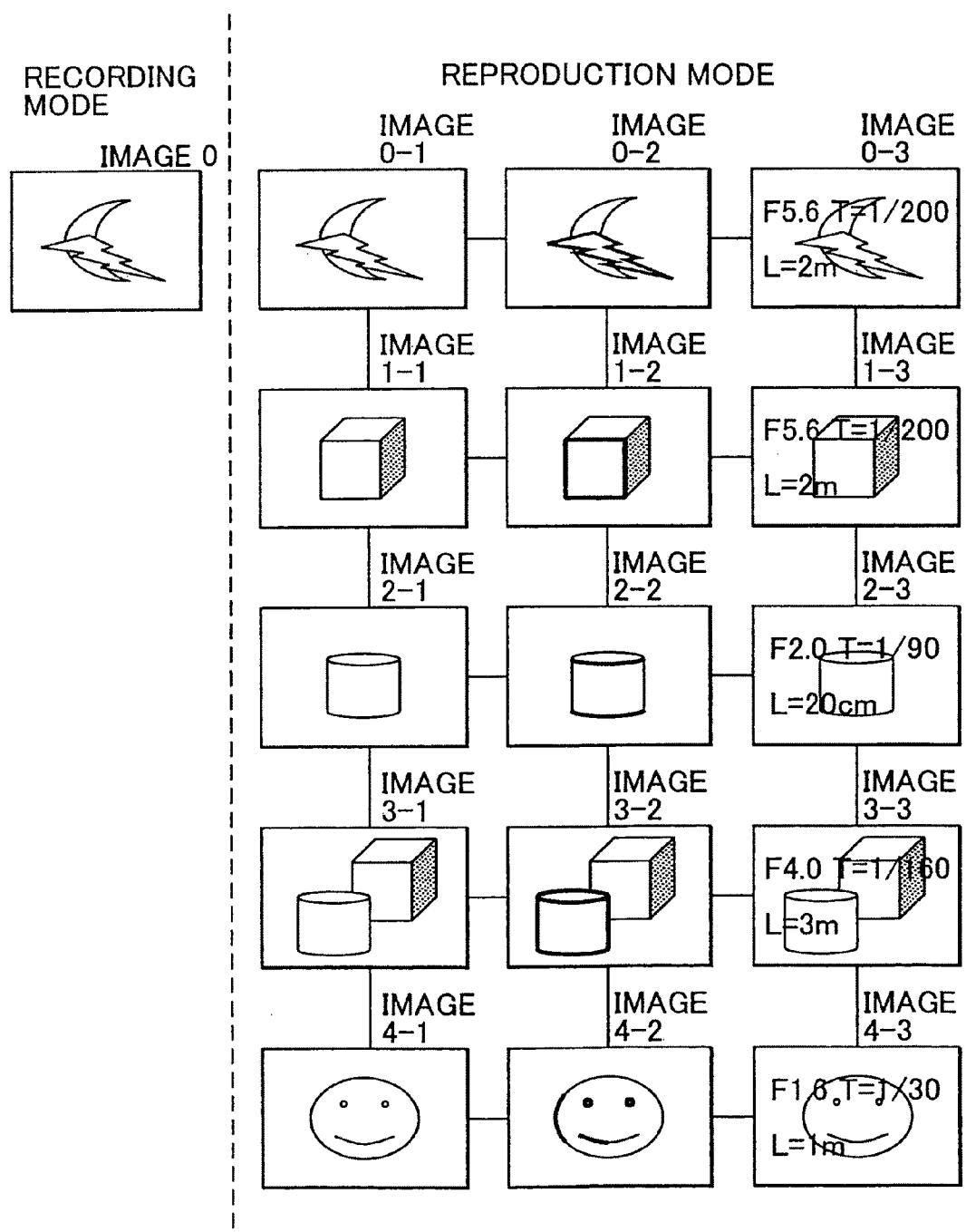
FIG. 15 shows images displayed in the recording mode and the reproduction mode.

When the operation shifts from the recording mode to the reproduction mode through an operation of the main switch 8, on the other hand, the display information stored in the CPU 439 is read out at the point in time at which the operation has shifted to the reproduction mode. As shown in FIG. 15, when the operation shifts to the reproduction mode after the image 0 is recorded in the recording medium 424 in the recording mode, the data corresponding to the image 0 that were recorded most recently are read out to the CPU 439 in the reproduction mode. The data corresponding to the image 0 thus read out are displayed on the display LCD 420 in conformance to the display information described above. For instance, if the above mentioned display mode (2) was set before the operation shifted to the recording mode most recently, the peaking processing mode is set to display data obtained by implementing peaking processing on the data corresponding to the image 0 read out from the recording medium 424 (image 0-2 shown in FIG. 15).

The features of the first embodiment explained above are summarized.

—Recording Mode—

(1) If it is decided that either the program mode or the shutter priority mode is set for the AE operation mode (step S112 Y) in the peaking processing mode, open aperture control is implemented (step 114) and, as a result, a bright through-image achieved through the peaking processing is displayed on the display LCD 420 in step S120 to achieve an advantage in that the verification of the focus state by the photographer is facilitated.

(2) If it is decided that either the aperture priority mode is set for the AE operation mode or it is set to off (manual mode) in the peaking processing mode (step S120 N), close aperture control is implemented to achieve the aperture value set by the photographer (step S116), and thus, it is possible to verify the depth of field in the through-image having undergone the peaking processing which is displayed on the display LCD 420 in step S120.

(3) Since it is not necessary to focus the captured image after the release button 9 is pressed all the way down, the peaking processing mode is cleared in step S133. As a result, a natural-looking freeze image which has not undergone peaking processing can be displayed on the display LCD 420 in step S134.

(4) Since the differentiation circuit 460a is engaged in the peaking processing to differentiate the brightness signal stored in the Y signal memory 435a among the image-capture signals resulting from the image-capturing operation at the CCD 214 and data representing the sum of the differentiated signal and the original brightness signal obtained at the adder circuit 460c are displayed on the display LCD 420, a portion of the subject image with well-defined contrast such as an edge becomes emphasized in black or white. In addition, since the levels of color difference signals R-Y and B-Y are set to 0 when the output value from the differentiation circuit 460a is higher than the specific voltage Vr, an image area with particularly high contrast is displayed in white to achieve better visibility.

(5) In the electronic viewfinder mode, the signal charges resulting from an image-capturing operation and stored at the CCD 214 are subsampled at a specific rate M corresponding to the display resolution at the display LCD 420 to read out only the subsampled signal charges. Thus, since the number of sets of data to be read out is reduced from the full number of signal charges, the required data area in the buffer memory 436 can be reduced. In addition, since the onus of the processing at the CPU 439 and the DSP 433 is reduced, a reduction in the length of processing time and a reduction in the power consumption are achieved.

(6) An autofocus (AF) operation for automatically detecting the focus position adjustment state achieved by the movable lens 2 and the peaking processing in (4) above are both implemented by using the image data that have undergone the subsampling readout implemented at the specific rate M as described above in (5). In other words, the contrast is detected during an AF operation by using the data displayed on the display LCD 420 and, once focus is achieved, high contrast portions in the data on display become emphasized. Thus, the image area over which focus is achieved can be verified with ease on the display LCD 420.

(7) A peaking area is selected from a plurality of areas achieved by dividing the photographic field, an autofocus (AF) operation is performed on the subject image located inside the peaking area fa and peaking processing is implemented on the subject image in the peaking area fa. Consequently, since it is not necessary to perform an AF operation and the peaking processing over the entire photographic field, the length of processing time can be reduced. In addition, since the peaking area fa containing the primary subject alone needs to be checked when verifying whether or not the primary subject is in focus on the display LCD 420, the verification process is facilitated.

—Reproduction Mode—

(8) The operation for feeding or rewinding images read out from the recording medium 424 one frame at a time performed by operating the peaking area selection button 19a or 19b and the operation for displaying image data obtained by implementing peaking processing on the image data read out from the recording medium 424 or displaying the image data read out from the recording medium 424 with recording information superimposed over them performed by operating the peaking area selection button 19c or 19d can be executed in combination. Thus, by operating the peaking area selection button 19a or 19b while an image having undergone the peaking processing such as the image 1-2 shown in FIG. 15 is on display, for instance, another frame is selected while peaking processing is still in effect and one of the images 1-2~4-2 is displayed. As a result, a camera achieving a high degree of operability, which facilitates the selection process for selecting the image in the frame achieving the best focus among the image data recorded at the recording medium 424, can be attained.

(9) The display information indicating the display mode of the image such as display of an image having undergone peaking processing or a superimposed image is stored in the CPU 439 when the operation shifts from the reproduction mode to the recording mode through an operation of the main switch 8, and the display information thus stored is read out when the operation shifts back to the reproduction mode from the recording mode. Consequently, when the data corresponding to the image 0 are read out from the recording medium 424 and are displayed on the display LCD 420, data obtained by implementing peaking processing on the data corresponding to the image 0 or the data with superimposed information is displayed on the display LCD 420 in correspondence to the display information that has been read out. As a result, when repeating an operation in which a subject is recorded in the recording mode, the reproduction mode is then selected to check the focus state on the peaking display, the recording mode is selected again for recording and the focus state is checked in the reproduction mode, the peaking display is implemented automatically when the reproduction mode is selected, to achieve a camera with a high degree of operability.

While the manual focus (MF) mode or the autofocus mode (the continuous AF (CAF) mode and the single AF (SAF) mode) is selected through the menu setting in the explanation above, such a selection may be made through a CAF/SAF/MF selector switch 463 shown in FIG. 3 instead of through menu setting.

While an image area with high contrast such as the edge of the subject image is emphasized in white at a high brightness level in display in the explanation of the peaking processing circuit 460 given above, such a high contrast image area may be indicated by using a complementary color of the background instead of in white. In addition, a high contrast area may be indicated by blinking black and white. In such cases, an advantage is achieved in that an emphasized area which may not stand out against a white background in the subject image can be easily recognized through the complementary color display or through the black and white blinking display.

In addition, while the peaking processing is implemented regardless of the aperture value setting (regardless of which of the openings 215a~215g at the aperture plate 215 is set in the optical path) in the explanation of the peaking processing circuit 460 given above, the gain at the differentiation circuit 460a and the specific voltage Vr input to the operational amplifier 460e may be varied in correspondence to the aperture value. For instance, when the depth of field is small with the aperture in a wide open state, the edges may be emphasized intensely, whereas if the aperture is contracted, and thus the depth of field is great, the edges may be emphasized only slightly. In this case, even when the depth of the photographic field is great and there are many areas in focus, an over-bright glaring display of the overall image resulting from emphasizing all the focused areas through peaking processing is prevented.

Furthermore, the gain at the differentiation circuit 460a and the specific voltage Vr input to the operational amplifier 460e may be varied in correspondence to the brightness of the background of the subject image. By intensely emphasizing the edges when the background is bright and only slightly emphasizing the edges if the background is dark, an advantage is achieved in that even when the brightness of the background changes, the emphasized areas can be discerned with ease.

While the frame rewind switch and the frame feed switch used in the reproduction mode are constituted of the peaking area selector buttons 19b and 19a respectively and the display selector switches used in the reproduction mode are constituted of the peaking area selector buttons 19c and 19d, the frame rewind/feed and the display selection may be implemented by operating the zoom operation button 14 and the selector dial 17, instead.

Second Embodiment

Figure 16:
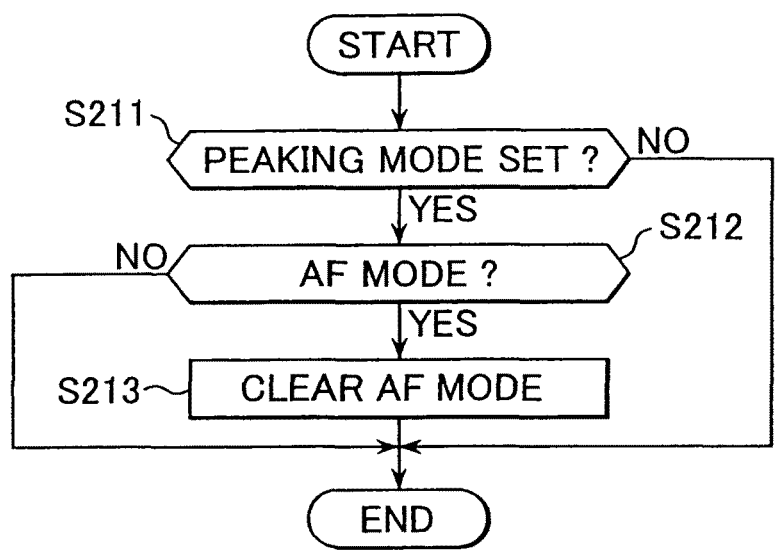
FIG. 16 is a flow chart of the decision-making processing implemented in a second embodiment.

While the aperture value set with the aperture plate 215 is controlled in correspondence to the AE operation mode setting in the peaking processing mode in the first embodiment, the AF operation mode is cleared if the peaking processing mode is on in the second embodiment. FIG. 16 is a flow chart of the procedure for clearing the AF operation mode implemented in the second embodiment.

In step S211, a decision is made as to whether or not the peaking processing mode has been set, and if an affirmative decision is made (step S211 Y), the operation proceeds to step S212, whereas if a negative decision is made (step S211 N), the processing shown in FIG. 16 ends. In step S212, a decision is made as to whether or not the AF operation mode has been set, and an affirmative decision is made if either the single AF mode or the continuous AF mode has been selected (step S212 Y), following which the operation proceeds to step S213 to clear the AF operation mode. If, on the other hand, the AF operation mode is off (manual mode), a negative decision is made in step S212 (step S212 N), and the processing shown in FIG. 16 ends.

In the second embodiment described above, if it is decided that the AF operation mode (either the single AF mode or the continuous AF mode) is set (step S212 Y) in the peaking processing mode, the AF operation mode is cleared (step S213). Thus, since the likelihood of the photographer performing a manual focusing operation after the photographer sets the electronic still camera 1 in the peaking processing mode is high, the AF operation mode is automatically cleared to set the electronic still camera 1 in the manual focus mode. As a result, since the photographer only needs to set the electronic still camera 1 in the peaking processing mode to perform a focal adjustment through a manual operation, an advantage is achieved in that the operability of the camera is improved.

Third Embodiment

While the peaking processing is implemented by engaging the peaking processing circuit 460 in the first embodiment and the second embodiment explained above, the peaking processing circuit 460 may be omitted to execute the processing implemented by the peaking processing circuit 460 through software instead. In such a case, the CPU 439 implements peaking processing on image data on the buffer memory 436 as necessary and writes the image data having undergone the peaking processing into the frame memory 435.

In software processing, the peaking processing is implemented by the DSP 433 on image data corresponding to the peaking area among the image data having undergone the image processing at the DSP 433. As the peaking processing mode is set in response to a command from the CPU 439, a brightness signal Y, a color difference signal R-Y and a color difference signal B-Y calculated by using the image data during the image processing are read out from the buffer memory 436. The brightness signal Y thus read out undergoes a differentiation operation, and the brightness signal having undergone the differentiation operation is added to the original brightness signal Y. The brightness signal Y' representing the sum is used as the brightness signal having undergone the peaking processing.

If the brightness signal resulting from the differentiation operation described above is larger than a specific value, color difference signals achieved by replacing the values of the color difference signal R-Y and the color difference signal B-Y read out from the buffer memory 436 with 0 are used as color difference signals having undergone the peaking processing. If, on the other hand, the value of the brightness signal resulting from the differentiation operation is equal to or lower than the specific value, the color difference signal R-Y and the color difference signal B-Y read out from the buffer memory 436, retaining their values, are directly utilized as color difference signals having undergone the peaking processing.

With the peaking processing described above implemented on the image data corresponding to the peaking area and the image data resulting from the peaking processing written into the frame memory 435, the image data having undergone the peaking processing are displayed on the display LCD 420. Since the values of the color difference signals over an area in which the brightness signal having undergone the differentiation operation indicates a value larger than the specific value are replaced with 0 through the peaking processing, the data corresponding to this area are displayed in white on the display LCD 420. Namely, an image area with high contrast such as an edge of the subject image is emphasized in white at high brightness in the display.

The color difference signal R-Y and the color difference signal B-Y read out from the buffer memory 436 are directly utilized over an area in which the brightness signal having undergone the differentiation operation indicates a value equal to or lower than the specific value in the peaking processing. Namely, the data in an area with low contrast in the subject image are displayed on the display LCD 420 based upon the color difference signal R-Y and the color difference signal B-Y. When the peaking processing mode is cleared in response to a command issued by the CPU 439, the brightness signal Y, the color difference signal R-Y and the color difference signal B-Y read out from the buffer memory 436 are directly written into the frame memory 435 and displayed on the display LCD 420 without undergoing peaking processing.

—Electronic Zoom—

The magnification of the subject image captured in the electronic still camera 1 is adjusted through an operation of the zoom operation button 14. The factors that determine the zoom magnification include an optical enlargement achieved through the movable lens 2 and the enlargement achieved through the electronic zoom processing in which image data that are obtained through an image-capturing operation at the CCD 214 are enlarged through electronic interpolation processing. If the zoom operation button 14 is operated toward the telephoto side (T) while the zoom magnification is not set for enlargement, i.e., while the magnification of the subject image is set at 1, the CPU 439 drives the zoom lens drive circuit 429 to change the zoom magnification for the movable lens 2 for enlargement. When the optical zoom magnification achieved by the movable lens 2 reaches its limit and the zoom operation button 14 is operated toward the telephoto side (T), the DSP 433 sets an electronic zoom magnification N in response to a command from the CPU 439 and implements electronic zoom processing by interpolating the image data at the magnification N that has been set.

FIG. 17 illustrates an electronic zoom operation performed with the electronic zoom magnification N set at 2, with FIG. 17A presenting image data obtained through a subsampling readout of the image data at the CCD 214 implemented as shown in FIG. 9A and illustrating the pixel arrangement prior to the electronic zoom enlargement. As shown in FIG. 17A, the arrangement of the color filters corresponding to the pixel arrangement following the subsampling read retains the same Bayer array pattern as the arrangement of the color filters prior to the subsampling read. Brightness signals and color difference signals are calculated by using the image data obtained through such a subsampled read. FIG. 17B presents brightness data calculated by using the image data shown in FIG. 17A, in which a brightness signal $Y6,6$, for example, represents the brightness signal corresponding to a pixel $G6,6$. The DSP 433 interpolates the brightness signals corresponding to the central four pixels in FIG. 17B so that a total of four pixels (two pixels (down) X two pixels (across)) corresponds to each of the four brightness signals after the interpolation processing, and brightness signals resulting from the interpolation processing are as shown in FIG. 17C. In FIG. 17C, the brightness signal corresponding to each of the four central pixels is enlarged by a factor of two both vertically and horizontally. Thus, the original image data can be electronically enlarged by using interpolated image data.

Figure 18:
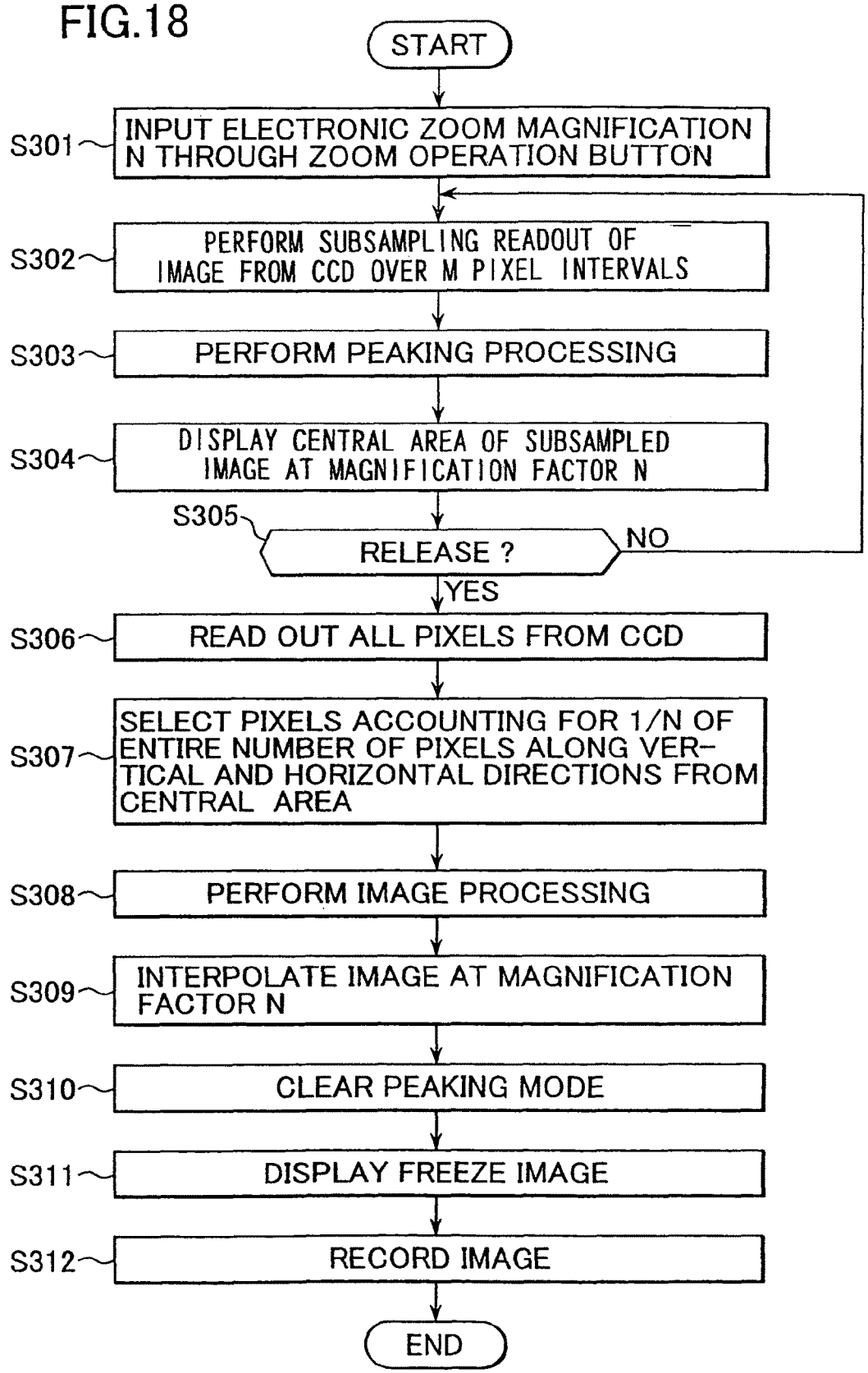
FIG. 18 is a flow chart representing the concept of the photographing processing achieved in a third embodiment.

An explanation is given on the photographing processing implemented in the recording mode in the electronic still camera 1 structured as described above. FIG. 18 is a conceptual flow chart of the photographing processing which is implemented by operating the main switch 8 and selecting the recording mode through the recording/reproduction selector switch 467. A zoom signal generated through an operation of the zoom operation button 14 and a halfway-press signal and a full-press signal generated through an operation of the release button 9 are input to the CPU 439. In step S301, if the zoom operation button 14 operated toward the telephoto side (T), the CPU 439 drives the zoom lens drive circuit 429 to increase the optical zoom magnification and if the zoom operation button 14 is still operated toward the telephoto side (T) after the optical magnification reaches a specific maximum value, an electronic zoom magnification N is determined in correspondence to the degree to which the zoom operation button 14 is operated toward the telephoto side. Then, the shutter plate 208 is driven to set the opening 208*b* on the shutter plate 208 in the optical path and the aperture plate 215 is driven to set the full opening 215*a* at the aperture plate 215 in the optical path, which allows the CCD 214 to store electrical charges to capture a subject image.

In step S302, through a subsampling readout of the stored charges at the CCD 214 implemented at the specific rate M corresponding to the display resolution at the display LCD 420, image data based upon the image signal obtained through the image-capturing operation are read out. The image data thus read out undergo analog processing at the image processing unit 431 and after they are converted to a digital signal by the A/D conversion circuit 432, a specific type of image processing is implemented on them at the DSP 433. The contrast in the image data is detected, and based upon the detected contrast, the lens drive circuit 430 is driven to adjust the focus position for the movable lens 2. In step S303, peaking processing is implemented on the image data corresponding to the peaking area fa that has been set.

In step S304, interpolation processing is implemented on the image data having undergone the peaking processing so as to enlarge them by a factor of N both vertically and horizontally if the electronic zoom magnification N is set larger than 1. With the image data at the central area in the image data having undergone the interpolation processing written into the frame memory 435, a through-image having undergone the peaking processing and the electronic zoom-in is displayed on the display LCD 420. If the electronic zoom magnification N is set at 1, the image data having undergone the peaking processing are written into the frame memory 435 without undergoing the interpolation processing for the electronic zoom, and the through image having undergone the peaking processing is displayed on the display LCD 420.

In step S305, an exposure calculation is performed by detecting the brightness of the subject in the image data and a decision is made as to whether or not a full-press signal has been input through the release button 9. If it is decided that a full-press signal has been input (step S305 Y), the operation proceeds to step S306, whereas if it is decided that no full-press signal has been input (step S305 N), the operation returns to step S302 to repeat the operation described above.

In step S306, a so-called electronic shutter operation is performed by clearing the electrical charges stored at the CCD 214 with a specific opening at the aperture plate 215 set in the optical path. The specific opening at the aperture plate 215 set in the optical path in this step is the opening corresponding to the aperture value determined through the exposure calculation. The CCD 214 is exposed over a specific length of time to store electrical charges and the subject image is captured. The length of the exposure period is controlled so as to ensure that the period of time elapsing after the electrical charges are cleared until the optical path is blocked by the shutter plate 208 matches the exposure period determined through the exposure calculation. When the exposure is completed, the full light-blocking portion 208*a* at the shutter plate 208 is set in the optical path and with the stored electrical charges read out from the CCD 214 without any of the charges subsampled, the image data based upon the image signal resulting from the image-capturing operation are read out.

In step S307, the image data that have been read out undergo analog processing at the image processing unit 431 and then are converted to digital signals by the A/D conversion circuit 432. The image data resulting from the conversion are stored in the buffer memory 436, and if the electronic zoom magnification is set at N, image data corresponding to the area which accounts for 1/N along the vertical and horizontal directions around the central area of the subject image are extracted. In step S308, the DSP 433 implements a specific type of image processing on the extracted image data. In step S309, the brightness signal and the color difference signal calculated through the image processing are interpolated N times along the vertical direction and the horizontal direction in correspondence to the electronic zoom magnification set at N.

In step S310, the peaking processing mode is cleared and with the image data having undergone the interpolation processing written into the frame memory 435 in step S311, a freeze image resulting from the electronic zoom-in which has not undergone peaking processing is displayed on the display LCD 420. However, if the electronic zoom magnification N is set at 1, no interpolation processing is implemented for an electronic zoom in step S309 and, consequently, the through-image is not electronically zoomed. In step S312, the data having undergone the image processing are compressed through a specific format and are recorded into the memory card 424. Through the processing described above, the sequence of the photographing processing shown in FIG. 18 ends.

In the third embodiment described above, after implementing the peaking processing (step S303 in FIG. 18) on the image data based upon the image-capturing signals read out from the CCD 214, the image data having undergone the peaking processing are interpolated at the factor N along the vertical direction and the horizontal direction and are displayed (step S304 in FIG. 18). As a result, as long as the subject image captured at the CCD 214 remains unchanged, the same portion of the image undergoes the peaking processing regardless of the setting for the electronic zoom magnification N. Namely, since an electronically zoomed image is generated by interpolating the image data having undergone the peaking processing, the data obtained by interpolating the portion emphasized through the peaking processing, too, are emphasized. Thus, no interruption manifests in the area emphasized through the peaking processing in the enlarged image obtained through the electronic zoom.

In the peaking processing achieved through software processing described above, the peaking processing is implemented regardless of the aperture value setting (regardless of which opening among the openings 215a-215g at the aperture plate 215 is set in the optical path). In other words, in the peaking processing, a decision is made as to whether or not the values indicated by the color difference signal R-Y and the color difference signal B-Y are to be replaced with 0 in conformance to whether or not the brightness signal value after the differentiation operation is larger than a specific value. By adjusting the specific value in correspondence to the aperture value setting, the intensity of emphasis to be achieved through the peaking processing can be varied in correspondence to the depth of field. For instance, if the aperture is open and the depth of field is small, the edges may be greatly emphasized, whereas if the aperture is constructed and thus the depth of field is great, the edges may be only slightly emphasized. As a result, even when the depth of field is great and there are numerous focused areas, the overall image is not displayed as a glaring image at a high brightness level.

Alternatively, the specific value may be adjusted in correspondence to the brightness of the background in the subject image. By highly emphasizing the edges when the background is bright and emphasizing the edges only slightly if the background is dark, an advantage is achieved in that even when the brightness of the background changes, emphasized areas can be easily discerned.

Fourth Embodiment

Figure 19:
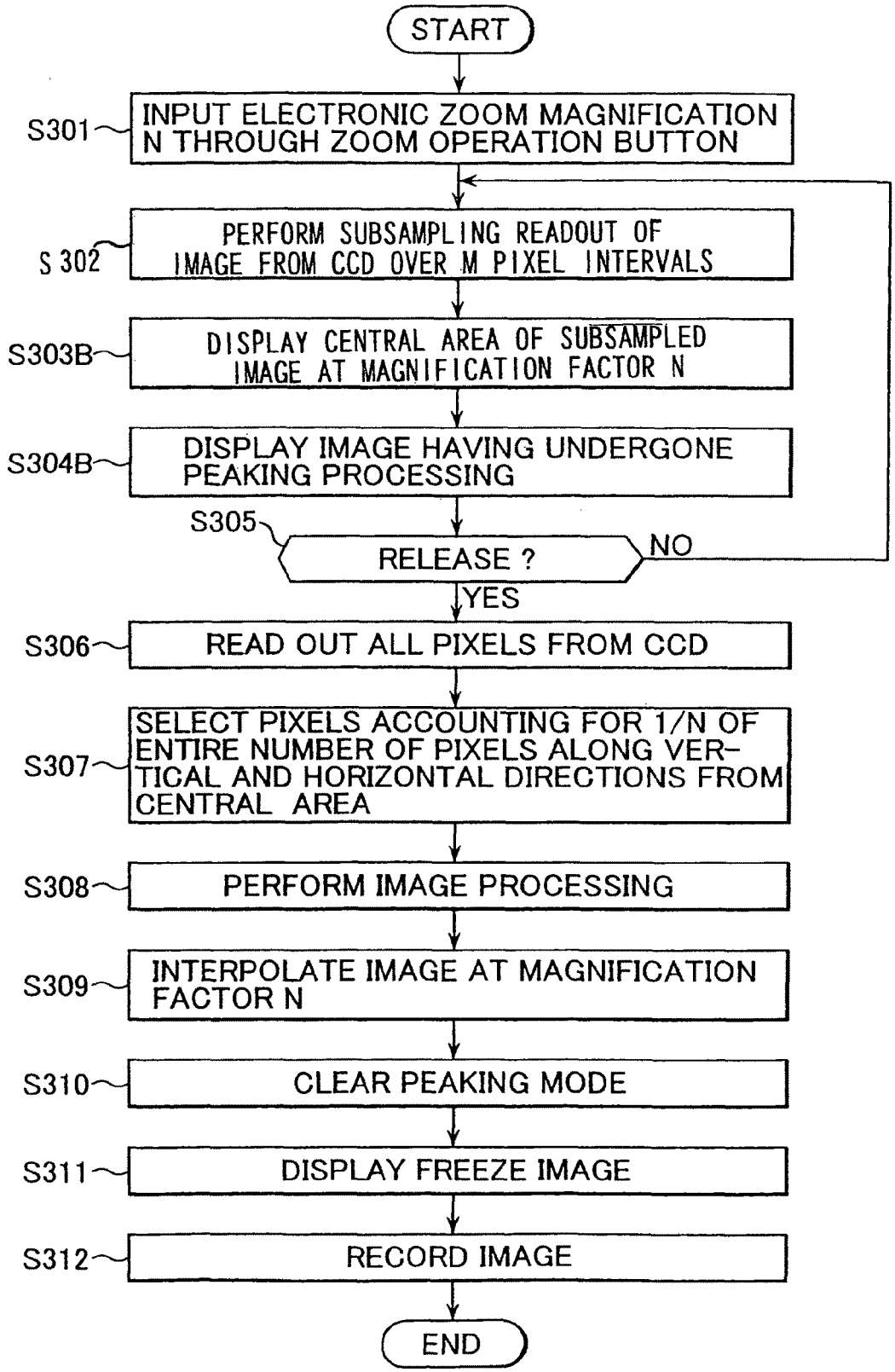
FIG. 19 is a flow chart representing the concept of the photographing processing achieved in a fourth embodiment.

While a through-image obtained by implementing interpolation processing after the peaking processing is displayed in the third embodiment, a through-image obtained through the peaking processing implemented after the interpolation processing is displayed in the fourth embodiment. FIG. 19 is a conceptual flow chart of the photographing processing achieved in the fourth embodiment. Since its only difference from the flow chart shown in FIG. 18 is the processing implemented in step S303B and step S304B, the explanation below focuses on these two steps.

In step S303B, if the electronic zoom magnification N is set larger than 1, interpolation processing is implemented to supplement the image data having undergone the image processing by the DSP 433 by a factor of N along the vertical direction and the horizontal direction. In the image data having undergone the interpolation processing, the image data corresponding to the central area are readied as data for through-image display. If the electronic zoom magnification N is set at 1, the image data having undergone the image processing at the DSP 433 are directly readied as data for through-image display without implementing interpolation processing.

In step S304B, the image data corresponding to the peaking area fa that has been set in the through-image display data are subsampled at a rate of one set of data in every N sets of data and only the subsampled image data are extracted. Then, peaking processing is implemented of the extracted subsampled image data. By writing the image data having undergone the peaking processing into the frame memory 435, a through-image that has been enlarged through the electronic zoom and emphasized through the peaking processing is displayed on the display LCD 420. In other words, the image data obtained through the subsampling extraction from the through-image display data are replaced with the data obtained through the peaking processing and displayed on the display LCD 420.

In the fourth embodiment described above, the interpolation processing (step S303B in FIG. 19) is implemented on the image data based upon the image-capture signals read out from the CCD 214 to enlarge them by a factor of N along the vertical direction and the horizontal direction. The peaking processing is implemented (step 304B in FIG. 19) by subsampling the image data corresponding to the peaking area fa in the image data having undergone the interpolation processing at the rate of one set of image data in every N sets. Generally speaking, if the electronic zoom magnification N is set larger than 1, the high-frequency component contained in the image data becomes lost through interpolation processing implemented on the image data at a factor of N along the vertical and horizontal directions and, as a result, the value obtained through the differentiation operation becomes smaller. However, by subsampling the interpolated image data at the rate of one set of image data in every N sets and performing a differentiation operation, a large differentiated value comparable to the value obtained through a differentiation operation performed before the interpolation processing can be obtained. In addition, since the peaking processing is implemented by extracting that have been subsampled at the rate of one set in every N sets, the volume of the calculation can be reduced compared to the volume of the operation that needs to be executed in peaking processing implemented by using all the data without subsampling them, to reduce the length of processing time.

Fifth Embodiment

While the peaking processing mode during a recording operation is set/cleared in advance at the CPU 439 in the digital still camera according to the first~fourth embodiments explained above, the CPU 439 may set/clear the peaking processing mode in correspondence to the operating state of the electronic still camera 1.

Figure 20:
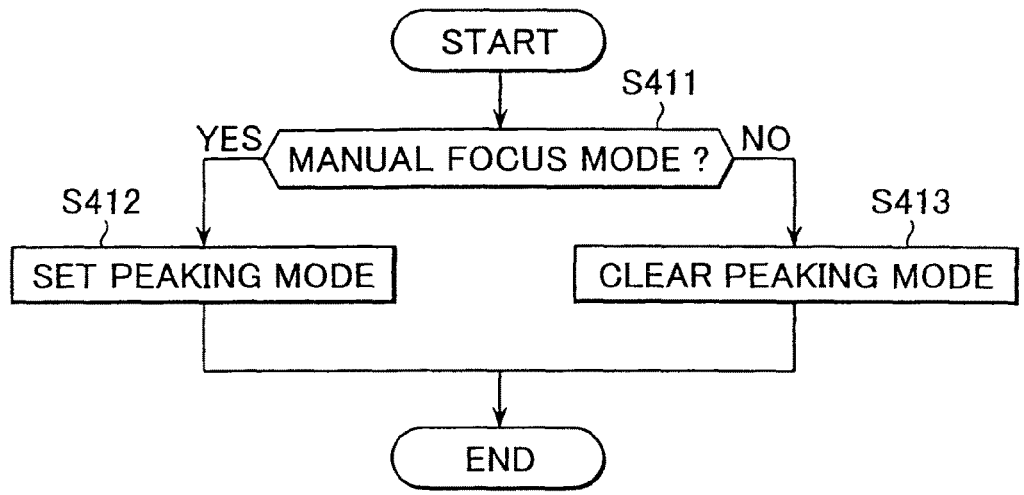
FIG. 20 is a flow chart of the decision-making processing implemented to decide whether or not peaking processing is to be performed in a fifth embodiment.

FIG. 20 is a flow chart of the decision-making processing which is implemented at the CPU 439 to make a decision as to whether or not peaking processing is to be performed in the digital still camera 1. In step S411 in FIG. 20, a decision is made as to whether or not the manual focus mode has been set. An affirmative decision is made in step S411 (step S411 Y) if "off (manual mode)" has been set in the "AF operation" setting menu shown in FIG. 7 described earlier, and in that case, the operation proceeds to step S412 to set the peaking processing mode for implementing peaking processing. If, on the other hand, either of the "continuous AF mode" or the "single AF mode" has been set in the "AF operation setting menu" shown in FIG. 7, a negative decision is made in step S411 (step S411 N) and, in such a case, the operation proceeds to step S413 to clear the peaking processing mode.

The features of the fifth embodiment explained above are summarized.
(1) Since the peaking processing mode for implementing peaking processing is set if the manual focus mode has been selected, an area in the subject image achieving high contrast when the subject image is in focus is emphasized in the display on the display LCD 420 to make it easy for the photographer to verify whether or not the subject image has been focused during a focus adjustment and to verify which portion of the subject image is in focus. Thus, the operability of the digital still camera is improved.
(2) Since no peaking processing is implemented in the autofocus mode (the continuous AF mode or the single AF mode) which does not require the photographer to perform focusing, the photographer can view a natural-looking subject image on the display LCD 420.

Sixth Embodiment

Figure 21:
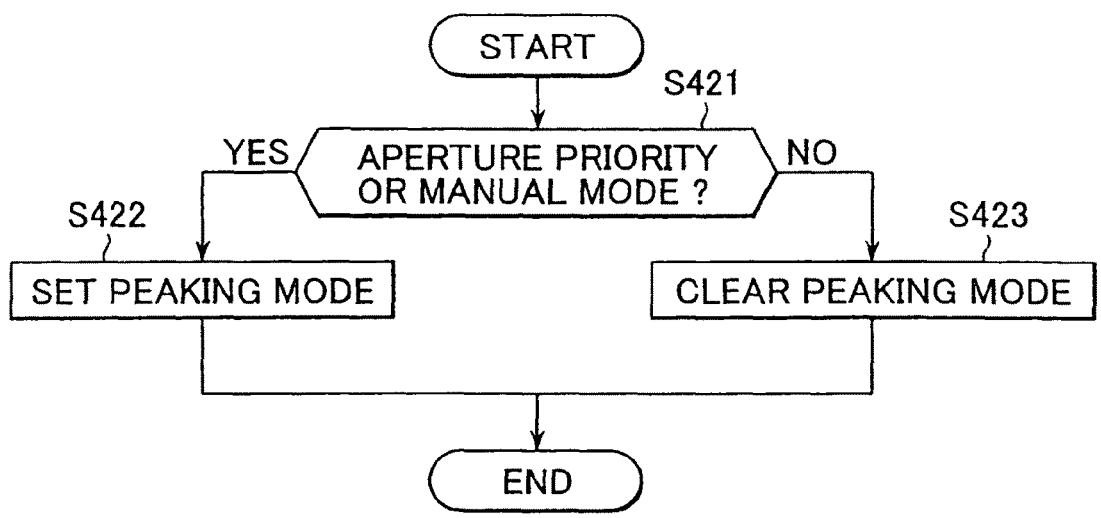
FIG. 21 is a flow chart of the decision-making processing implemented to decide whether or not peaking processing is to be performed in a sixth embodiment.

The sixth embodiment differs from the fifth embodiment in the decision-making processing implemented to make a decision as to whether or not peaking processing is to be performed. FIG. 21 is a flow chart of the decision-making processing performed at the CPU 439 in the electronic still camera 1 according to the sixth embodiment. In step S421 in FIG. 21, a decision is made as to whether or not the aperture priority AE mode or the manual mode has been selected. An affirmative decision is made in step S421 (step S421 Y) if "aperture priority" or "off (manual mode)" has been selected in the "AE operation" setting menu shown in FIG. 6 explained earlier, and in that case, the operation proceeds to step 422 to set the peaking processing mode for implementing peaking processing. If, on the other hand, or "program," "shutter priority" has been selected in the "AE operation setting menu" shown in FIG. 6, a negative decision is made in step S421 (step S421 N) and, in such a case, the operation proceeds to step S423 to clear the peaking processing mode.

The features of the sixth embodiment are summarized.
(1) Since the peaking processing mode for implementing peaking processing is set if the AE mode for performing an exposure calculation by giving priority to the aperture or the mode for manually performing exposure has been selected, a portion of the subject image achieving high contrast when the image is focused is emphasized in the display on the display. LCD 420. As a result, the peaking processing is implemented under circumstances in which the photographer is highly likely to take into consideration the depth of field and, consequently, the verification of areas in focus on the display LCD 420 is facilitated.
(2) Since peaking processing is not implemented if the program AE mode or the shutter speed priority AE mode, in which the photographer is not likely to take into consideration the depth of field has been selected the photographer can view a natural-looking subject image on the display LCD 420.

While "aperture priority," "program," "shutter priority" or "manual" is selected through a menu setting in the explanation given above, one of them may be selected AE mode selector switch 464 shown in FIG. 3 instead of through the menu setting.

Seventh Embodiment

Figure 22:
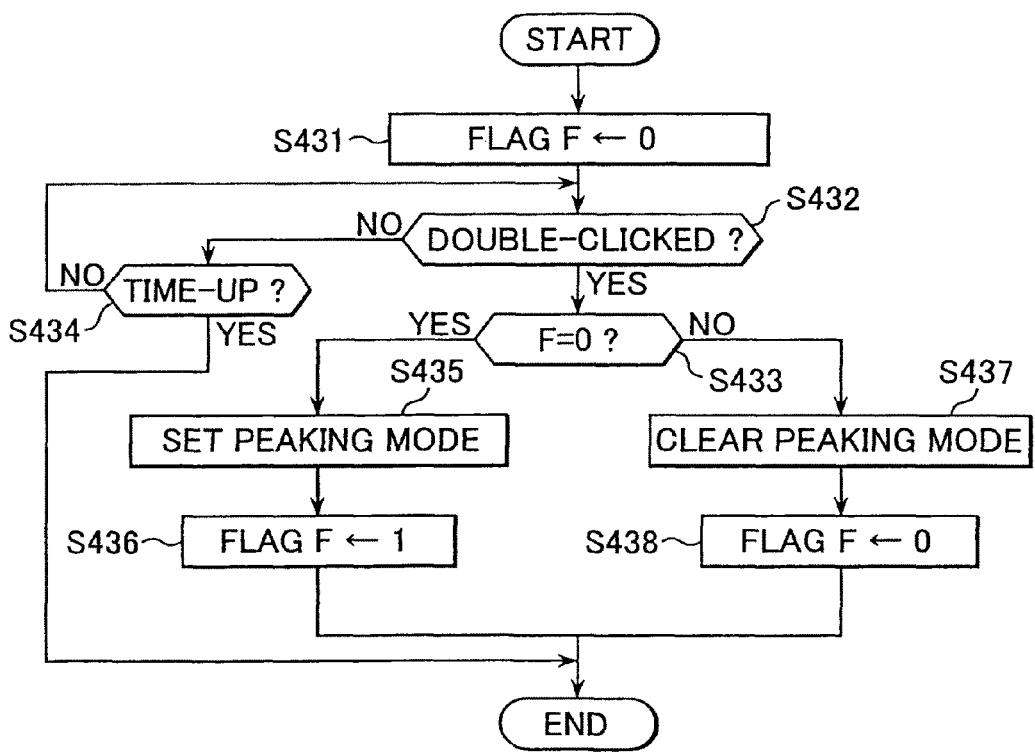
FIG. 22 is a flow chart of the decision-making processing implemented to decide whether or not peaking processing is to be performed in a seventh embodiment.

The seventh embodiment differs from the fifth and sixth embodiments in the decision-making processing implemented to decide as to whether or not peaking processing is to be performed. FIG. 22 is a flow chart of the decision-making processing implemented at the CPU 439 in the electronic still camera 1 according to the seventh embodiment. In step S431 in FIG. 22, a flag F which indicates whether or not the peaking processing mode has been set is set to an initial value 0. In step S432, a decision is made as to whether or not the release button 9 has been double-clicked. The double-clicking operation in this context refers to an operation through which a halfway-press signal is input twice through the release button 9 within a specific period of time. If it is decided that a double-clicking operation has been performed (step S432 Y), the operation proceeds to step S433 to make a decision as to whether or not the flag F is set at 0. If it is decided that a double-clicking operation has not been performed (step S432 N), the operation proceeds to step S434 to make a decision as to whether or not a time-up has occurred in timer processing implemented over a specific period of time.

If an affirmative decision is made that a time-up has occurred in step S434, the processing shown in FIG. 22 ends, whereas if a negative decision is made, the operation returns to step S432. If it is decided in step S433 that the flag F is set at 0 (step S433 Y), the operation proceeds to step S435 to set the peaking processing mode, and after the flag F is set to 1 in step S436, the processing shown in FIG. 22 ends. If, on the other hand, it is decided in step S433 that the flag F is not set at 0 (step S433 N), the operation proceeds to step S437 to clear the peaking processing mode, and after the flag F is set to 0 in step S438, the processing shown in FIG. 22 ends.

The feature of the seventh embodiment is summarized. Since the peaking processing mode can be set or cleared simply by double-clicking the release button 9, the photographer is able to perform a photographing operation promptly without having to operate other operating members.

Eighth Embodiment

Figure 23:
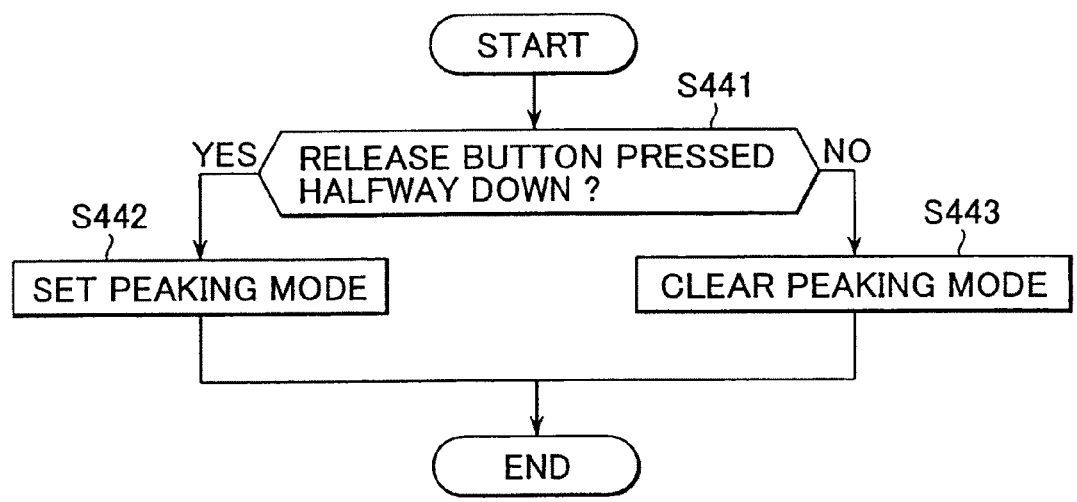
FIG. 23 is a flow chart of the decision-making processing implemented to decide whether or not peaking processing is to be performed in an eighth embodiment.

The eighth embodiment differs from the fifth~seventh embodiments in the decision-making processing implemented to decide whether or not peaking processing is to be performed. FIG. 23 is a flow chart of the decision-making processing implemented at the CPU 439 in the electronic still camera 1 according to the eighth embodiment. In step S441 in FIG. 23, a decision is made as to whether or not a halfway-press signal has been input through the release button 9. If an affirmative decision is made in step S441 (step S441 Y), the operation proceeds to step S442 to set the peaking processing mode for implementing peaking processing. If, on the other hand, a negative decision is made in step S441 (step S441 N), the operation proceeds to step S443 to clear the peaking processing mode.

The feature of the eighth embodiment is summarized. Since the peaking processing mode is set by pressing the release button 9 halfway down and the peaking processing mode is cleared once the halfway-press operation stops, the photographer is able to perform the photographing operation promptly, without having to take his finger off the release button 9.

Ninth Embodiment

Figure 24:
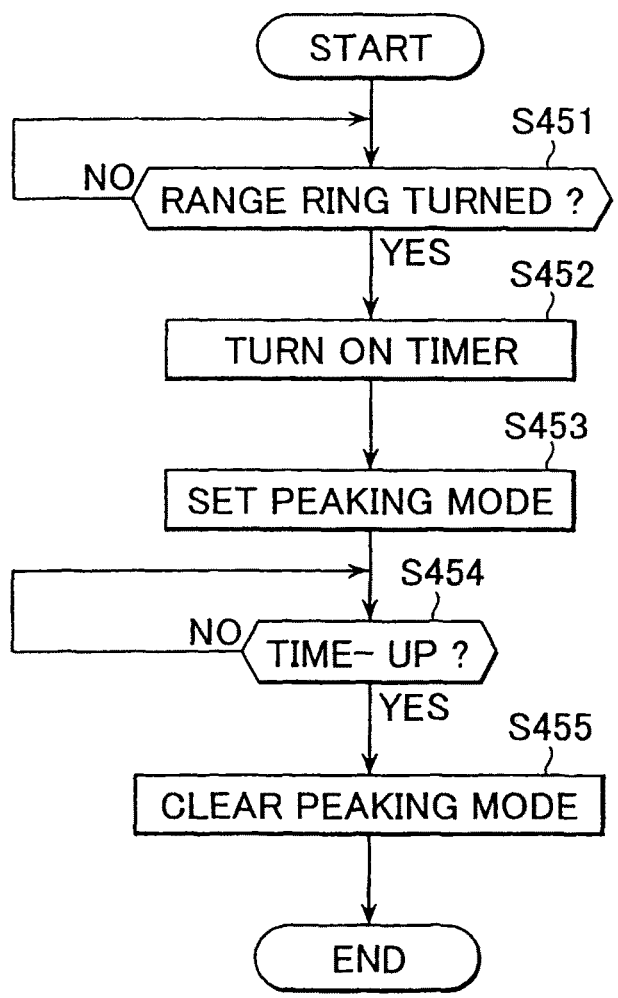
FIG. 24 is a flow chart of the decision-making processing implemented to decide whether or not peaking processing is to be performed in a ninth embodiment.

The ninth embodiment differs from the fifth~eighth embodiments in the decision-making processing implemented to decide whether or not peaking processing is to be performed. FIG. 24 is a flow chart of the decision-making processing implemented at the CPU 439 in the electronic still camera 1 according to the ninth embodiment. In step S451 in FIG. 24, a decision is made as to whether or not the range ring 462 that is operated to perform a focus adjustment has been turned. If a negative decision is made (step S451 N), the operation waits for the range ring 462 to be operated, whereas if an affirmative decision is made (step S451 Y), the operation proceeds to step S452 to set a timer to run over a specific length of time (e.g., approximately 16 seconds). The peaking mode is sent in step S453, and a decision is made in step S454 as to whether or not a time-up has occurred. If it is decided that a time-up has occurred (step S454 Y), the operation proceeds to step S455 to clear the peaking processing mode and thus the processing shown in FIG. 24 ends. If a negative decision is made in step S454 (step S454 N), the operation waits for a time-up.

The feature of the ninth embodiment is summarized. Since the peaking processing mode is set when the photographer operates the range ring 462 to perform a focus adjustment and the peaking processing mode is cleared when approximately 16 seconds have elapsed, peaking processing is automatically implemented only while the photographer performs the focus adjustment, and thus, an improvement in the operability of the camera is achieved.

Tenth Embodiment

Figure 25:
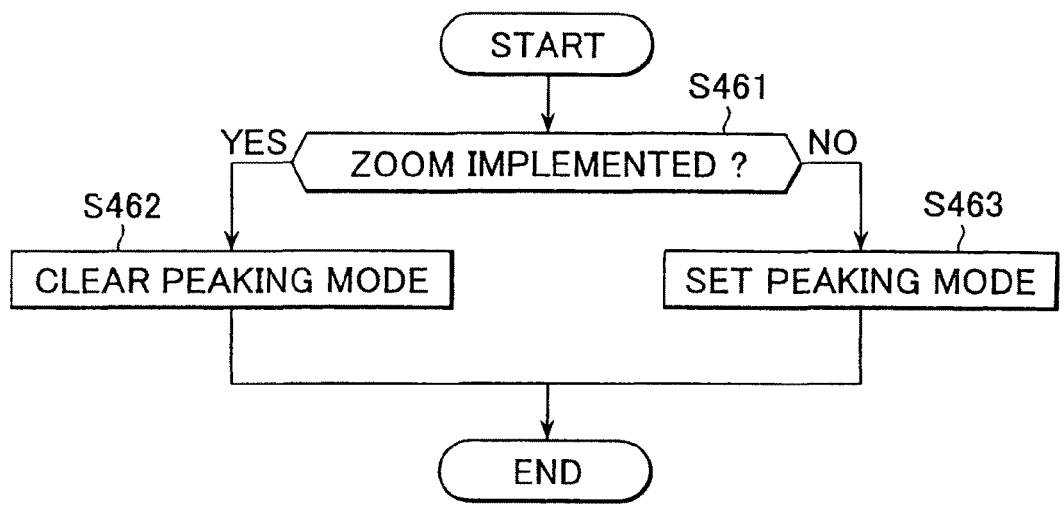
FIG. 25 is a flow chart of the decision-making processing implemented to decide whether or not peaking processing is to be performed in a tenth embodiment.

The tenth embodiment differs from the fifth~ninth embodiments in the decision-making processing implemented to decide whether not peaking processing is to be performed. FIG. 25 is a flow chart of the decision-making processing implemented at the CPU 439 in the electronic still camera 1 according to the tenth embodiment. In step 461 in FIG. 25, a decision is made as to whether or not the zoom operation button 14 has been operated to adjust the focal length of the movable lens 2. If an affirmative decision is made in step S461 (step S461 Y), the operation proceeds to step S462 to clear the peaking processing mode so that peaking processing is not implemented. If, on the other hand, a negative decision is made in step S461 (step S461 N), the operation proceeds to step S463 to set the peaking processing mode.

The feature of the tenth embodiment is summarized. Since the peaking processing mode is cleared when the photographer operates the zoom operation button 14 to adjust the zoom magnification and the peaking processing mode is set when the operation of the zoom operation button 14 ends, no peaking processing is implemented even if the focus becomes offset temporarily during a zooming operation, for instance. Thus, there is no inconsistency whereby the edges of the subject image on the display LCD 420 may or may not be emphasized during a zooming operation and the photographer is not presented with an unnatural transition.

Eleventh Embodiment

Figure 26:
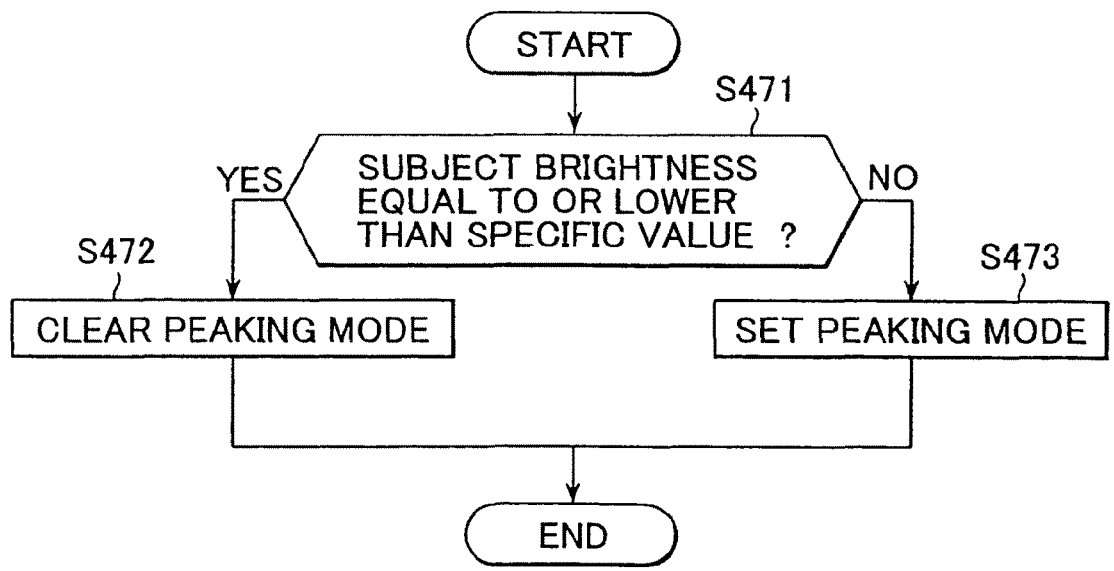
FIG. 26 is a flow chart of the decision-making processing implemented to decide whether or not peaking processing is to be performed in an eleventh embodiment.

The eleventh embodiment differs from the fifth~tenth embodiments in the decision-making processing implemented to decide whether or not peaking processing is to be performed. FIG. 26 is a flow chart of the decision-making processing implemented at the CPU 439 in the electronic still camera 1 according to the eleventh embodiment. In step S471 in FIG. 26, a decision is made as to whether or not the brightness of the subject detected in the image data obtained at the CCD 214 indicates a value equal to or lower than a specific value. If an affirmative decision is made in step S471 (step S471 Y), the operation proceeds to step S472 to clear the peaking processing mode so that peaking processing is not implemented. If, on the other hand, a negative decision is made in step S471 (step S471 N), the operation proceeds to step S473 to set the peaking processing mode.

The features of the eleventh embodiment are now summarized. Since the peaking processing mode is cleared if the brightness value of the subject is equal to or lower than the specific value, the photographer is prevented for making an erroneous judgment that the subject image has not been focused when the subject image has actually been focused but the edges of the subject image on the display LCD 420 are not emphasized due to lowered contrast attributable to a low brightness level of the subject. In addition, there is another advantage achieved in that if there is a bright area in an unfocused background, the bright area in the background is not emphasized.

Twelfth Embodiment

Figure 27:
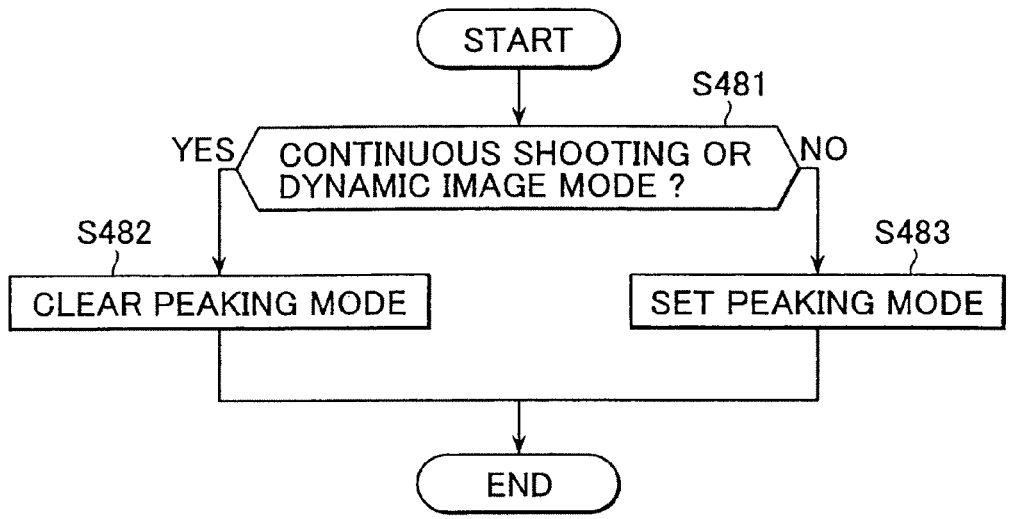
FIG. 27 is a flow chart of the decision-making processing implemented to decide whether or not peaking processing is to be performed in the twelfth embodiment.

The twelfth embodiment differs from the fifth~eleventh embodiments in the decision-making processing implemented to decide whether or not peaking processing is to be performed. FIG. 27 is a flow chart of the decision-making processing implemented at the CPU 439 in the electronic still camera 1 according to the twelfth embodiment. In step S481 in FIG. 27 a decision is made as to whether or not the continuous shooting mode or the dynamic image mode has been selected by setting the main switch 8 to the REC (C) position. The continuous shooting mode is selected by turning off the dynamic image mode in a dynamic image mode setting screen (not shown) provided in the menu setting, whereas the dynamic image mode is selected by turning on the dynamic image mode in the dynamic image mode setting screen. In the continuous shooting mode, a continuous shooting operation is performed at a rate of approximately eight frames per second by holding down the release button 9, whereas a photographing operation is performed at approximately 30~60 frames per second in the dynamic image mode.

If an affirmative decision is made in step S481 (step S481 Y), the operation proceeds to step S482 to clear the peaking processing mode so that peaking processing is not implemented. If, on the other hand, a negative decision is made in step S481 (step S481 N), the operation proceeds to step S483 to set the peaking processing mode.

The feature of the twelfth embodiment is summarized. Since the peaking processing mode is cleared if the continuous shooting mode or the dynamic image mode has been selected, the processing load at the CPU 439 is reduced to reduce the length of time required for photographing processing for a single frame, thereby achieving an advantage in that a greater number of frames to be photographed is assured.

Thirteenth Embodiment

Figure 28:
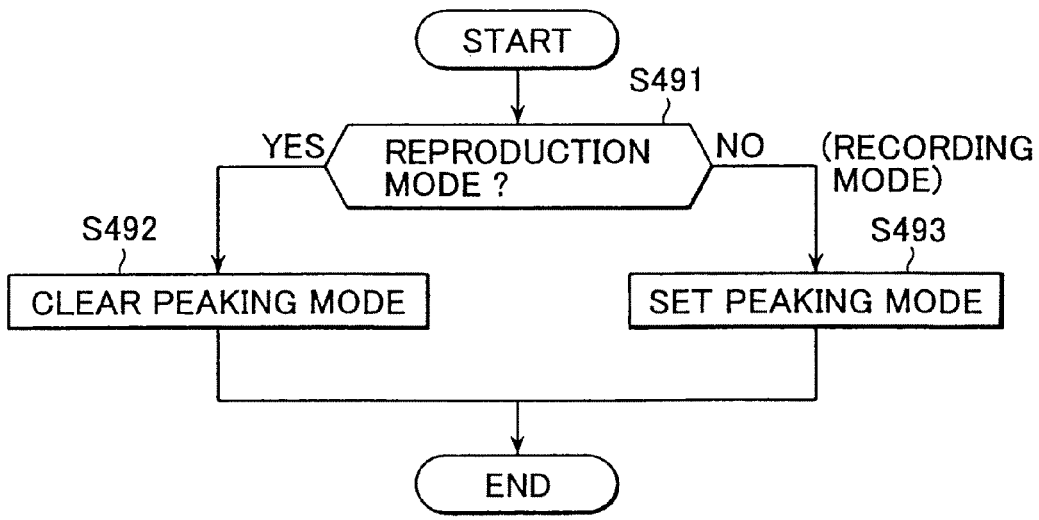
FIG. 28 is a flow chart of the decision-making processing implemented to decide whether or not peaking processing is to be performed in a thirteenth embodiment.

The thirteenth embodiment differs from the fifth~twelfth embodiments in the decision-making processing implemented to decide whether or not peaking processing is to be performed. FIG. 28 is a flow chart of the decision-making processing implemented at the CPU 439 in the electronic still camera 1 according to the thirteenth embodiment. In step S491 in FIG. 28, a decision is made as to whether or not the reproduction mode has been selected through the main switch 8. If an affirmative decision is made in step S491 (step S491 Y), the operation proceeds to step S492 to clear the peaking processing mode so that peaking processing is not implemented. If, on the other hand, a negative decision is made in step S491 (step S491 N), the operation proceeds to step S493 to set the peaking processing mode.

The feature of thirteenth embodiment is summarized. Since the peaking processing mode is cleared if the reproduction mode has been selected, a natural-looking recorded image can be reproduced on the display LCD 420 in the reproduction mode in which focusing is not required.

Fourteenth Embodiment

Figure 29:
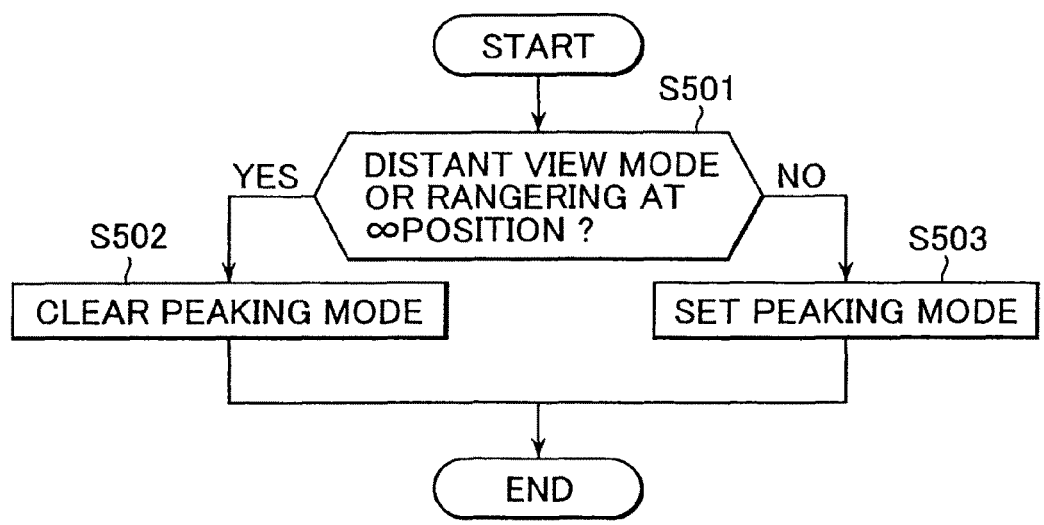
FIG. 29 is a flow chart of the decision-making processing implemented to decide whether or not peaking processing is to be performed in a fourteenth embodiment.

The fourteenth embodiment differs from the fifth~thirteenth embodiments in the decision-making processing implemented to decide whether or not peaking processing is to be performed. FIG. 29 is a flow chart of the decision-making processing implemented at the CPU 439 in the electronic still camera 1 according to the fourteenth embodiment. In step S501 in FIG. 29, a decision is made as to whether or not the distant view photographing mode has been selected through the photographing distance mode button 12 or as to whether or not the range ring 462 is set to inficinity (∞). Each time the photographing distance mode button 12 is pressed, the photographing mode is cyclically switched, i.e., macro photographing mode→distant view photographing mode→normal photographing distance mode. In the distant view photographing mode, the range ring 462 is adjusted to the infinite distance position even if the autofocus mode has been selected.

If an affirmative decision is made in step S501 (step S501 Y), the operation proceeds to step S502 to clear the peaking processing mode so that peaking processing is not implemented. If, on the other hand, a negative decision is made in step S501 (step S501 N), the operation proceeds to step S503 to set the peaking processing mode.

The feature of the fourteenth embodiment is summarized. Since the peaking processing mode is cleared if the distant view photographing mode has been selected or if the range ring 4.62 is set at the infinity position, the implementation of the peaking processing is averted under a situation in which a correct edge emphasis cannot be achieved due to a low contrast image when photographing a subject in the infinite distance range.

Fifteenth Embodiment

Figure 30:
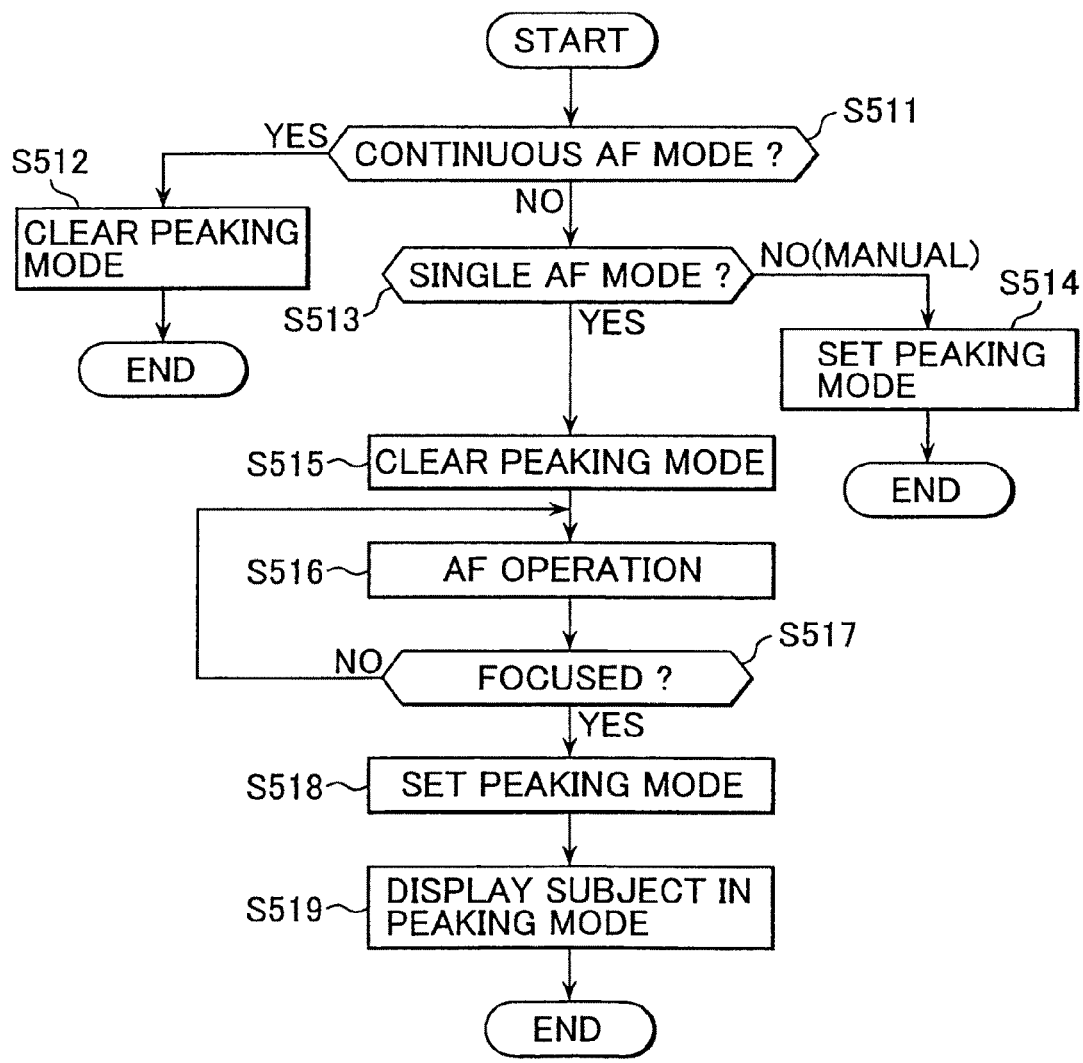
FIG. 30 is a flow chart of the decision-making processing implemented to decide whether or not peaking processing is to be performed in a fifteenth embodiment.

The fifteenth embodiment differs from the fifth~fourteenth embodiments in the decision-making processing implemented to decide whether or not peaking processing is to be performed. FIG. 30 is a flow chart of the decision-making processing implemented at the CPU 439 in the electronic still camera 1 according to the fifteenth embodiment. In step S511 in FIG. 30, a decision is made as to whether or not the continuous AF mode has been selected. If an affirmative decision is made in step S511 (step S511 Y), the operation proceeds to step S512 to clear the peaking processing mode so that peaking processing is not implemented. If, on the other hand, a negative decision is made in step S511 (step S511 N), the operation proceeds to step S513 to make a decision as to whether or not the single AF mode has been selected.

A negative decision is made (step S513 N) if the manual focus (MF) mode has been selected, and in that case, the operation proceeds to step S514 to set the peaking processing mode before the processing shown in FIG. 30 ends. An affirmative decision is made (step S513 Y) if the single AF mode has been selected and, in such a case, the operation proceeds to step S515 to clear the peaking processing mode. In step S516, an AF operation for driving the movable lens 2 by detecting the focal adjustment state is performed, and a decision is made in step S517 as to whether or not focus has been achieved. If a negative decision is made (step S517 N), the operation returns to step S516, whereas if an affirmative decision is made (step S517 Y), the operation proceeds to step S518 to set the peaking processing mode. In step S519, the focused subject image is displayed with its high contrast area emphasized.

The features of the fifteenth embodiment are summarized. (1) Since the peaking processing mode is cleared in the continuous AF mode in which the photographer is highly likely to perform a photographing operation while checking the subject image displayed on the display LCD 420, an advantage is achieved in that the display is easy on the eyes.
(2) Since the peaking processing mode remains cleared until focus is achieved if the single AF mode has been selected and the peaking processing mode is set after the image becomes focused, the photographer can check a natural-looking subject image on the display LCD 420 before the subject image becomes focused. Once the subject image is focused, the photographer can check the depth of field by viewing the subject image in which the edges are emphasized.

Sixteenth Embodiment

Figure 31:
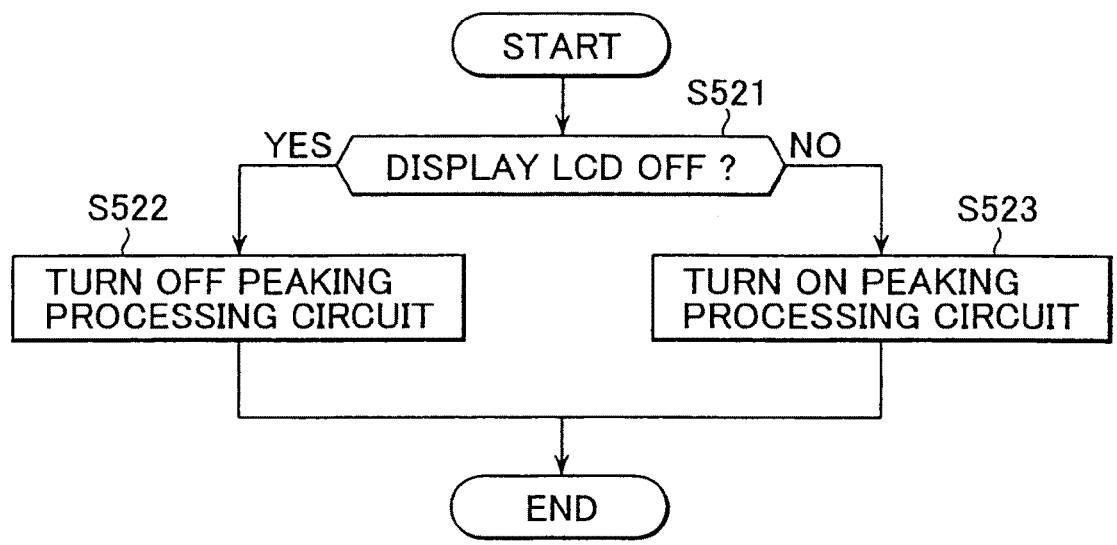
FIG. 31 is a flow chart of the decision-making processing implemented to decide whether or not peaking processing is to be performed in a sixteenth embodiment.

The sixteenth embodiment differs from the fifth~fifteenth embodiments in the decision-making processing implemented to decide whether or not peaking processing is to be performed. FIG. 31 is a flow chart of the decision-making processing implemented at the CPU 439 in the electronic still camera 1 according to the sixteenth embodiment. In step S521 in FIG. 31, a decision is made as to whether or not the display on the display LCD 420 has been turned off through the monitor display button 15. If an affirmative decision is made in step S521 (step S521 Y), the operation proceeds to step S522 to turn off the power supplied to the peaking processing circuit 460 by driving the switch 470. The peaking processing mode becomes cleared at this time. If, on the other hand, a negative decision is made in step S521 (step S421 N), the operation proceeds to step S523 to turn on the power to be supplied to the peaking processing circuit 460 by driving the switch 470. The peaking processing mode is set at this time.

The feature of the sixteenth embodiment is now summarized. Since the peaking processing mode is cleared and the power applied to the peaking processing circuit 460 is turned off if the display on the display LCD 420 is turned off, an advantage of energy-saving is achieved.

Seventeenth Embodiment

Figure 32:
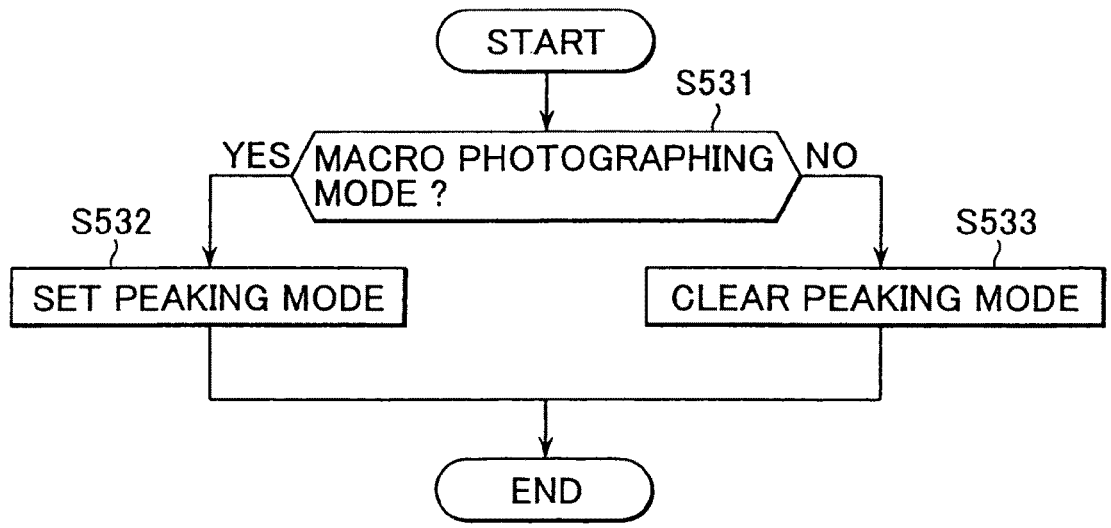
FIG. 32 is a flow chart of the decision-making processing implemented to decide whether or not peaking processing is to be performed in a seventeenth embodiment.

The seventeenth embodiment differs from the fifth~sixteenth embodiments in the decision-making processing implemented to decide whether or not peaking processing is to be performed. FIG. 32 is a flow chart of the decision-making processing implemented at the CPU 439 in the electronic still camera 1 according to the seventeenth embodiment. In step S531 in FIG. 32, a decision is made as to whether or not the macro photographing mode has been selected through the photographing distance mode button 12.

If an affirmative decision is made in step S531 (step S531 Y), the operation proceeds to step S532 to set the peaking processing mode to implement peaking processing. If, on the other hand, a negative decision is made in step S531 (step S531 N), the operation proceeds to step S533 to clear the peaking processing mode.

The feature of the seventeenth embodiment is now summarized. Since the peaking processing mode is set if the macro photographing mode has been selected, a focused area in the subject image on the display LCD 420 can be checked with ease and thus, the operability of the camera is improved.

While an explanation is given above on examples in which the various methods of decision-making processing implemented to decide whether or not peaking processing is to be executed in the fifth~seventeenth embodiments are adopted independently of one another, these decision-making processing methods corresponding to the individual embodiments may be combined in actual implementation.

While an explanation is given above on examples in which the present invention is adopted in an electronic still camera, it may be adopted in a video camera and an electronic camera capable of implementing peaking processing and electronic zoom processing as well.

What is claimed is:

1. An electronic still camera, comprising:
   an image-capturing device that captures a subject image through a taking lens;
   a subsampling circuit that subsamples an image-capture signal output from the image-capturing device and reads out subsampled image-capture signals;
   a digital signal processor that performs image pretreatment on each of the subsampled image-capture signals subsampled by the subsampling circuit to form pretreated image data;
   a memory that stores a brightness signal Y and color difference signals R-Y, B-Y in the pretreated image data;
   a first signal processing circuit that performs first edge enhancement on all of the subsampled image-capture signals subsampled by the subsampling circuit;
   a second signal processing circuit that performs additional enhancement processing that is a second edge enhancement on the first edge-enhanced subsampled image-capture signal subjected to the first edge enhancement by the first signal processing circuit;
   an area selection circuit that divides a photographic field of the subject image captured by the image-capturing device into a plurality of areas and selects a specific area therefrom according to an input operation by a user;
   a control circuit that sets the first signal processing circuit and the second signal processing circuit in an on-state or an off-state in correspondence to photographing conditions; and
   a brightness detection circuit that detects the brightness of the subject image,
   wherein:
   the first edge enhancement is performed on an image data corresponding to the specific area selected by the area selection circuit,
   the second edge enhancement further emphasizes a portion of the subsampled image-capture signal subjected to the first edge enhancement, the portion having a contrast higher than a specific value,
   the first and the second signal processing circuits, in respective edge enhancement operations, output a brightness signal achieved by adding the differentiated signal to an original brightness signal and color difference signals R-Y and B-Y whose levels are set to zero when the differentiated brightness signal obtained from the brightness signal Y is higher than a predetermined value or the brightness signal achieved by adding the differentiated signal to an original brightness signal and original color difference signals R-Y and B-Y that are read out from the memory when the differentiated brightness signal obtained from the brightness signal Y is lower than the predetermined level, and
   the control circuit turns off the first processing circuit and the second signal processing circuit when a detection value obtained by the brightness detection circuit is equal to or less than a specific value.

2. The electronic still camera according to claim 1, further comprising:
   a display device that displays a subject image by using the subsampled image-capture signal obtained through a subsampling readout executed by the subsampling circuit.

3. The electronic still camera according to claim 1, further comprising:
   a contrast detection circuit that detects contrast in the subject image by using the subsampled image-capture signal obtained through a subsampling readout executed by the subsampling circuit; and
   a focal point detection circuit that detects a focal adjustment state of the taking lens by using the results of a detection performed by the contrast detection circuit.

4. The electronic still camera according to claim 1, further comprising:
   an input device that transmits a signal setting the specific area among the plurality of areas in response to the input operation by the user.

5. The electronic still camera according to claim 1, wherein the specific value based on which the control circuit turns off the first and second signal processing circuits is varied depending on an aperture value such that intensity of emphasis of the edge enhancement is decreased as depth of photographic field increases.

6. The electronic still camera according to claim 1, wherein the specific value based on which the control circuit turns off the first and second signal processing circuits is varied depending on a brightness of a background of a subject image such that intensity of emphasis of the edge enhancement is decreased as the brightness of the background of the subject image is increased.

7. An electronic still camera, comprising:
   an image-capturing device that captures a subject image through a taking lens;
   a subsampling circuit that subsamples an image-capture signal output from the image-capturing device and reads out subsampled image-capture signals;
   a first signal processing circuit that performs first edge enhancement on all of the subsampled image-capture signals subsampled by the subsampling circuit;
   a second signal processing circuit that performs additional enhancement processing that is a second edge enhancement on the first edge-enhanced subsampled image-capture signal subjected to the first edge enhancement by the first signal processing circuit, and
   a control circuit that sets the first signal processing circuit and the second signal processing circuit in an on-state or an off-state in correspondence to photographing conditions,
   wherein:
   the second edge enhancement further emphasizes a portion of the subsampled image-capture signal subjected to the first edge enhancement, the portion having a contrast higher than a specific value, the first and the second signal processing circuits, in respective edge enhancement operations, output a brightness signal achieved by adding the differentiated signal to an original brightness signal and color difference signals R-Y and B-Y whose levels are set to zero when the differentiated brightness signal obtained from the brightness signal Y is higher than a predetermined value or the brightness signal achieved adding the differentiated signal to an original brightness signal and original color difference signals R-Y and B-Y that are read out from a memory when the differentiated brightness signal obtained from the brightness signal Y is lower than the predetermined level, and the control circuit rums off the first processing circuit and the second signal processing circuit when a detection value obtained by the brightness detection circuit is equal to or less than a specific value.

* * * * *